United States Patent [19]
Matsukura et al.

[11] Patent Number: 6,145,126
[45] Date of Patent: Nov. 7, 2000

[54] APPARATUS AND METHOD FOR INSTALLING SOFTWARE AND RECORDING MEDIUM STORING PROGRAM FOR REALIZING THE METHOD

[75] Inventors: Ryuichi Matsukura; Kazuo Sasaki; Satoru Watanabe; Akihiko Obata, all of Kanagawa; Tohru Okahara, Osaka, all of Japan

[73] Assignee: Fujitsu Limited, Kawasaki, Japan

[21] Appl. No.: 09/060,348

[22] Filed: Apr. 15, 1998

[30] Foreign Application Priority Data

Dec. 11, 1997 [JP] Japan .................................. 9-340902

[51] Int. Cl.[7] .......................... G06F 9/445; G06F 15/16; G06F 15/177; G06F 15/173; G06F 12/00
[52] U.S. Cl. ........................ 717/11; 709/201; 709/220; 709/223; 707/700
[58] Field of Search ........................ 395/712; 707/200; 717/11; 709/201

[56] References Cited

U.S. PATENT DOCUMENTS

| | | | |
|---|---|---|---|
| 4,888,683 | 12/1989 | Koizumi et al. | 709/222 |
| 5,142,680 | 8/1992 | Ottman et al. | 717/11 |
| 5,155,847 | 10/1992 | Kirouac et al. | 709/221 |
| 5,187,790 | 2/1993 | East et al. | 709/316 |
| 5,247,683 | 9/1993 | Holmes et al. | 709/221 |
| 5,321,841 | 6/1994 | East et al. | 709/107 |
| 5,339,435 | 8/1994 | Lubkin et al. | 717/11 |
| 5,421,009 | 5/1995 | Platt | 709/221 |
| 5,539,909 | 7/1996 | Tanaka et al. | 709/315 |

(List continued on next page.)

OTHER PUBLICATIONS

Wood, A.; "Predicting Client/Server Availability". IEEE/IEE Electronic Library[online], Computer, vol. 28, Iss. 4, pp. 41–48, Apr. 1995.

Baomin et al.; "Design and Implementation of Integrated Network Management System". IEEE/IEE Electronic Library[online], Proceedings of the 1996 International Conference on Communication Technology, vol. 1, pp. 379–382, May 1996.

Chan, P.; "A client/server platform for automation of global network management". Proceedings of the 1994 IEEE International Conference on Industrial Technology, pp. 355–360, Dec. 1994.

Brusil et al.; "Toward a unified theory of managing large networks". IEEE/IEE Electronic Library[online], IEEE Spectrum, vol. 26, Iss. 4, pp. 39–42, Apr. 1989.

Pasquale, J.; "Using Expert Systems to Manage Distributed Computer Systems", IEEE/IEE Electronic Library[online], IEEE Network, vol. 2, Iss. 5, pp. 22–28, Sep. 1988.

Takano, M.; "Multilevel network management by means of system identification". IEEE/IEE Electronic Library[online], Fourteenth Annual Joint Conference of the IEEE Computer and Communications Societies, vol. 2, pp. 538–545, Apr. 1995.

Newell, D.; "Interoperable object models for large scale distributed systems". IEEE/IEE Electronic Library[online], International Seminar on Client/Server Computing, vol. 1, pp. 14/1–14/6, Oct. 1995.

*Primary Examiner*—Tariq R. Hafiz
*Assistant Examiner*—Kelvin E. Booker
*Attorney, Agent, or Firm*—Staas & Halsey LLP

[57] ABSTRACT

The present invention provides a software installing apparatus and a software installing method that facilitate the use of cooperatively operable software by automatically setting the user parameters, even in an environment where the users can connect or disconnect their PCs to the network frequently, and provides a recording medium storing a program for realizing the method. A client object includes an identifier storing part for storing the identifier of a computer on which a server object corresponding to the client object operates. The client object is transmitted to a computer. When the client object starts in the computer, the computer where the corresponding server object starts can be easily identified.

22 Claims, 45 Drawing Sheets

U.S. PATENT DOCUMENTS

| | | | |
|---|---|---|---|
| 5,555,416 | 9/1996 | Owens et al. | 717/11 |
| 5,557,748 | 9/1996 | Norris | 709/220 |
| 5,654,901 | 8/1997 | Boman | 717/11 |
| 5,666,501 | 9/1997 | Jones et al. | 345/348 |
| 5,684,996 | 11/1997 | Westerholm et al. | 717/11 |
| 5,740,361 | 4/1998 | Brown | 713/201 |
| 5,852,717 | 12/1998 | Bhide et al. | 709/203 |
| 5,884,322 | 3/1999 | Sidhu et al. | 707/200 |
| 5,991,823 | 11/1999 | Cavanaugh, III et al. | 709/330 |

*Fig. 14A*

| Linked Client Identifier |
|---|
| BC 75 CF 5F BD 71 |
| BC 75 CF 5F BD 72 |
| BC 75 CF 5F BD 73 |
| BC 75 CF 5F BD 74 |
|  |
|  |

*Fig. 14B*

| Linked Client Identifier |
|---|
| 10.254.211.145 |
| 10.254.211.146 |
|  |
|  |
|  |
|  |

Fig. 15A

| Server Object Names | Client Object Names |
|---|---|
| O b j e c t A | O b j e c t A |
| O b j e c t B | O b j e c t B |
| O b j e c t C | O b j e c t C |
| O b j e c t D | O b j e c t D |
| | |
| | |

Fig. 15B

| Server Object Names | Linked Client Identifier |
|---|---|
| O b j e c t A | BC 75 CF 5F BD 71 |
| O b j e c t B | BC 75 CF 5F BD 72 |
| O b j e c t C | BC 75 CF 5F BD 73 |
| | |
| | |
| | |

| Client Object Names | Identifier |
|---|---|
| O b j e c t A | BC 75 CF 5F BD 74 |
| O b j e c t B | BC 75 CF 5F BD 75 |
| O b j e c t C | BC 75 CF 5F BD 76 |
| | |
| | |
| | |

*Fig. 16*

| Client Object Names | Permitted Users' Identifier |
|---|---|
| ObjectA | User1、User2、User3 |
| ObjectB | All |
| ObjectC | All |
| | |
| | |
| | |

*Fig. 24*

| Location | Room A | Room B |
|---|---|---|
| Available Object | Object A | Object B |
| | Object B | Object C |
| | Object C | |
| | | |
| | | |
| | | |

*Fig. 26*

| Location | Room A | | Room B | |
|---|---|---|---|---|
| | Object Name | Identifier | Object Name | Identifier |
| Available Object | Object A | 10.254.211.145 | Object B | 10.254.212.146 |
| | Object B | 10.254.211.146 | Object C | 10.254.212.146 |
| | Object C | 10.254.211.146 | | |
| | | | | |

*Fig. 27*

| Portable Radio Identifier | User Identifier | Computer Identifier |
|---|---|---|
| 080-123-4567 | User1 | 10.254.211.145 |
| 080-765-4321 | User2 | 10.254.211.146 |
| 080-456-7890 | User3 | 10.254.211.146 |
| 080-987-6543 | User4 | 10.254.211.145 |

*Fig. 31*

| User Identifier | Radio Station Identifier |
|---|---|
| User1 | Station A |
| User2 | Station B |
| User3 | Station A |
| User4 | Station A |

*Fig. 32*

| Radio Station | Station A | Station B |
|---|---|---|
| Available Object | Object A | Object B |
| | Object B | Object C |
| | Object C | |
| | | |
| | | |
| | | |

*Fig. 33*

| Radio Station | Station A | | Station B | |
|---|---|---|---|---|
| Available Object | Object Name | Identifier | Object Name | Identifier |
| | Object A | 10.254.211.145 | Object B | 10.254.212.146 |
| | Object B | 10.254.211.146 | Object C | 10.254.212.146 |
| | Object C | 10.254.211.146 | | |
| | | | | |

*Fig. 34*

APPARATUS AND METHOD FOR INSTALLING SOFTWARE AND RECORDING MEDIUM STORING PROGRAM FOR REALIZING THE METHOD

BACKGROUND OF THE INVENTION

1. Field of the Invention

The present invention relates to an apparatus and a method for installing software and a recording medium storing a program for realizing the method. This apparatus makes it possible to automatically set parameters needed to be changed in compliance with a linked computer, a location, usable resources or the like, in an environment where objects operate cooperatively between a plurality of computers connected to a network.

2. Description of the Related Art

In recent years, personal computers (hereinafter referred to as "PC"s) have been so widely used in offices that the maintenance cost of a large amount of software for the PCs used in the offices is steadily increasing. For the purpose of curtailing the cost, a new type of PCs called network terminals is available.

The network terminal is basically supplied with a program, such as word processing software, from a server that manages the program, every time the network terminal needs the program, rather than managing the program in the network terminal itself. In other words, since a server collectively updates a program whose version has been upgraded, it is not necessary to update the program on the PCs. Therefore, it is not necessary for users to take care of the version of software, because the software managed by the server is constantly maintained at the latest version.

Furthermore, the use of the network terminals makes it possible to use software at places other than the office or through another PC, as long as the network covers those places or the PC.

However, so far, most software programs that can be utilized by the network terminals operate individually on a PC to which the software program is transmitted. In other words, the software programs generally do not operate cooperatively with other PCs. Moreover, in the case where individual PCs are brought into a meeting room to exchange electronic information, it is necessary to utilize a software program that operates cooperatively between the individual PCs. However, in order to utilize the cooperatively operable software, it is necessary to change the setting of the IP address and other parameters of the PCs to which information is transmitted, depending on the PC on the other side of the cooperation or the location of the utilization.

In the related art, since PCs only can download programs that are statically managed by a server, each user has to set an IP address and other parameters in order to utilize a cooperatively operable software. However, users usually do not know the IP address of a place where they bring their PCs, so that they have to ask the network manager about the IP address of that place. As a result, even if users take their own PCs with them, the PCs cannot be effectively utilized.

SUMMARY OF THE INVENTION

Therefore, with the foregoing in mind, it is an object of the present invention to provide a software installing apparatus and a software installing method that facilitate the use of a software program that operates cooperatively between linked users by automatically setting the parameters of the users, even in an environment where the users can connect or disconnect their PCs to the network frequently, and to provide a recording medium storing a program for realizing the method.

A software installing apparatus of the present invention operates in a system for cooperatively operating a server object and a client object between at least two computers connected to a network. The server object operates on a computer and waits for access from another computer. The client object operates on a computer other than the computer on which the server object operates and accesses the server object. The software installing apparatus includes a server object storage for storing at least one server object, server identifier acquiring means for acquiring an identifier of a computer on which the server object operates, a client object storage for storing at least one client object including an identifier storage for storing the identifier acquired by the server identifier acquiring means, identifier storing means for storing the identifier acquired by the server identifier acquiring means in the identifier storage included in the client object corresponding to the operating server object, and object transmitting means for transmitting at least one of the server object and the client object in response to a request from the computer for operating the object. The server object is stored in the server object storage, and the client object is stored in the client object storage and includes the identifier storage for storing the identifier.

In one embodiment of the present invention, the server object and the client object include a main application that operates and a control object that starts the main application. The identifier storage is included in the control object of the client object. The object transmitting means transmits only the control object or the control object and the main application. Therefore, the present invention can be applied to a commercially available object that does not include the identifier storage.

In another embodiment of the present invention, the software installing apparatus further includes client object operation end detecting means for detecting an end of operation of the client object in the computer on which the client object operates, counting means for counting the number of computers on which the client object operates, based on the number of times the client object is transmitted and the number of times of the end of the operation detected by the client object operation end detecting means, and count determining means for determining whether or not the number of the computers on which the client object operates counted by the counting means becomes zero. In the case where the number of computers on which the client object operates becomes zero, it is no longer necessary to allow the server object to operate in many cases, so that this embodiment of the present invention facilitates the management of the server object.

In still another embodiment of the present invention, the software installing apparatus further includes a first table for storing a list of operating server objects, and a second table for storing a corresponding relationship between the client object and an identifier of a computer on which the client object can operate. The object transmitting means transmits only the client object that can be used in a computer that requested to transmit the client object to the computer with reference to the first and second tables. This embodiment of the present invention makes it possible to transmit only the client object that can be used by the computer in view of the functions and performance of the computer.

In yet another embodiment of the present invention, the software installing apparatus further includes new object receiving means for receiving a new object transmitted from a computer, object determining means for determining whether the object received by the new object receiving means is the server object or the client object, and object storing means for storing the object received by the new object receiving means in at least one of the server object storage and the client object storage. This embodiment is effective in the case where an object that is not registered in a certain location is stored, for example, in a note size PC or the like, and brought in the location to be used in the location. Furthermore, in the case where the server object and the client object is not the same, the object can be identified for registration.

In another embodiment of the present invention, the software installing apparatus further includes server object operation managing means for determining whether a computer on which the server object is operating exists. In the case where the server object operation managing means receives a notification of start of the server object, the object transmitting means transmits the client object corresponding to the server object to a computer that requested to transmit the corresponding client object before the server object starts. When the server object is not operating, the client object usually cannot be used. However, this embodiment makes it possible to transmit the client object upon the start of the server object to the computer that attempted to use the client object when the server object is not operating.

In still another embodiment of the present invention, the software installing apparatus further includes server object operation end detecting means for detecting an end of operation of the server object in a computer on which the server object is operating, and client object operation terminating means for terminating operation of the client object corresponding to the server object when the server object operation end detecting means detects the end of the operation of the server object. When the server object ends the operation, it is usual that the client object cannot be utilized. Therefore, with the above-described structure, the client object that cannot be utilized is prevented from operating.

In yet another embodiment of the present invention, the software installing apparatus further includes a table for storing a corresponding relationship between a plurality of networks and objects available for each network, and network identifying means for identifying a network to which a computer is connected. The object transmitting means transmits only the object available for the network determined by the network identifying means with reference to the table. This is effective, for example, in the case where an object to be used in a plurality of LANs is managed by one computer.

In another embodiment of the present invention, the software installing apparatus further includes a first table for storing a corresponding relationship between locations of a computer and objects available for each location, a second table for storing a corresponding relationship between users and a computer carried by each user, user identifying means for identifying a user with reference to the second table when a computer is connected, and user location identifying means for identifying a location of a user identified by the user identifying means. The object transmitting means transmits only the object available for the location with reference to the first table based on the location of the user identified by the user location identifying means when a computer is connected. As the user location identifying means, for example, by identifying the location of the user from the identifier of the portable radio station used by the portable radio of the user, an available object can be managed in a wider area, and only the object available for the location can be transmitted.

In still another embodiment of the present invention, the software installing apparatus further includes a table for storing a corresponding relationship between a plurality of networks and objects available for each network, and network designation receiving means for receiving designation of a network from a computer that is connected from outside the network. The object transmitting means transmits only the object available for the designated network with reference to the table. For example, this embodiment is effective in the case of the connection via a telephone line from a rural area.

In yet another embodiment of the present invention, in the case where the object includes a plurality of modules, the server object storage and the client object storage store the object divided into a plurality of modules. The object transmitting means transmits a divisional module at the time when the computer needs the divisional module. Dividing the object and transmitting a necessary module of the divided object makes it possible to reduce the amount of transmission data.

According to another aspect of the invention, the present invention provides a method for installing software in a system for cooperatively operating a server object and a client object between at least two computers connected to a network. The server object operates on a computer and waits for access from another computer. The client object operates on a computer other than the computer on which the server object operates and accesses the server object. The method includes the steps of acquiring an identifier of a computer on which the server object operates, and storing the identifier acquired by the server identifier acquiring step in an identifier storage included in the client object.

According to another aspect of the invention, the present invention provides a computer-readable recording medium that stores a program for realizing a method for installing software in a system for cooperatively operating a server object and a client object between at least two computers connected to a network. The server object operates on a computer and waits for access from another computer. The client object operates on a computer other than the computer on which the server object operates and accesses the server object. The program executes the steps of acquiring an identifier of a computer on which the server object operates, and storing the identifier acquired by the server identifier acquiring step in an identifier storage included in the client object By using the software installing apparatus and the software installing method according to the present invention, a computer on which a client object operates can access and be linked to a computer on which a server object operates without searching information concerning the computer on which a server object operates.

Therefore, even in an environment where users connect or disconnect their PCs to the network frequently, a cooperatively operable program can be easily used by automatically setting the user parameters.

Furthermore, using the software installing apparatus and the software installing method according to the present invention provides a robust system.

These and other advantages of the present invention will become apparent to those skilled in the art upon reading and understanding the following detailed description with reference to the accompanying figures.

BRIEF DESCRIPTION OF THE DRAWINGS

FIGS. 14A and 14B are diagrams showing exemplary linked client management tables in the fourth embodiment of the present invention.

FIGS. 15A and 15B are diagrams showing exemplary available server object management tables in the fourth embodiment of the present invention.

FIG. 16 is a diagram showing an exemplary available client object management table in the fourth embodiment of the present invention.

FIG. 24 is a diagram showing an exemplary management table of objects that can be provided in the eighth embodiment of the present invention.

FIG. 26 is a diagram showing an exemplary available server object management table in the ninth embodiment of the present invention.

FIG. 27 is a diagram showing an exemplary available client object management table in the ninth embodiment of the present invention.

FIG. 31 is a diagram showing an exemplary table stored in a location identifying part 118 in the tenth embodiment of the present invention.

FIG. 32 is a diagram showing an exemplary table storing the corresponding relationship between the user identifier and the radio station identifier in the tenth embodiment of the present invention.

FIG. 33 is a diagram showing an exemplary available server object management table in the tenth embodiment of the present invention.

FIG. 34 is a diagram showing an exemplary available client object management table in the tenth embodiment of the present invention.

DESCRIPTION OF THE PREFERRED EMBODIMENTS

Hereinafter, the present invention will be described by way of embodiments with reference to the accompanying drawings.

First Embodiment

Figure 1:
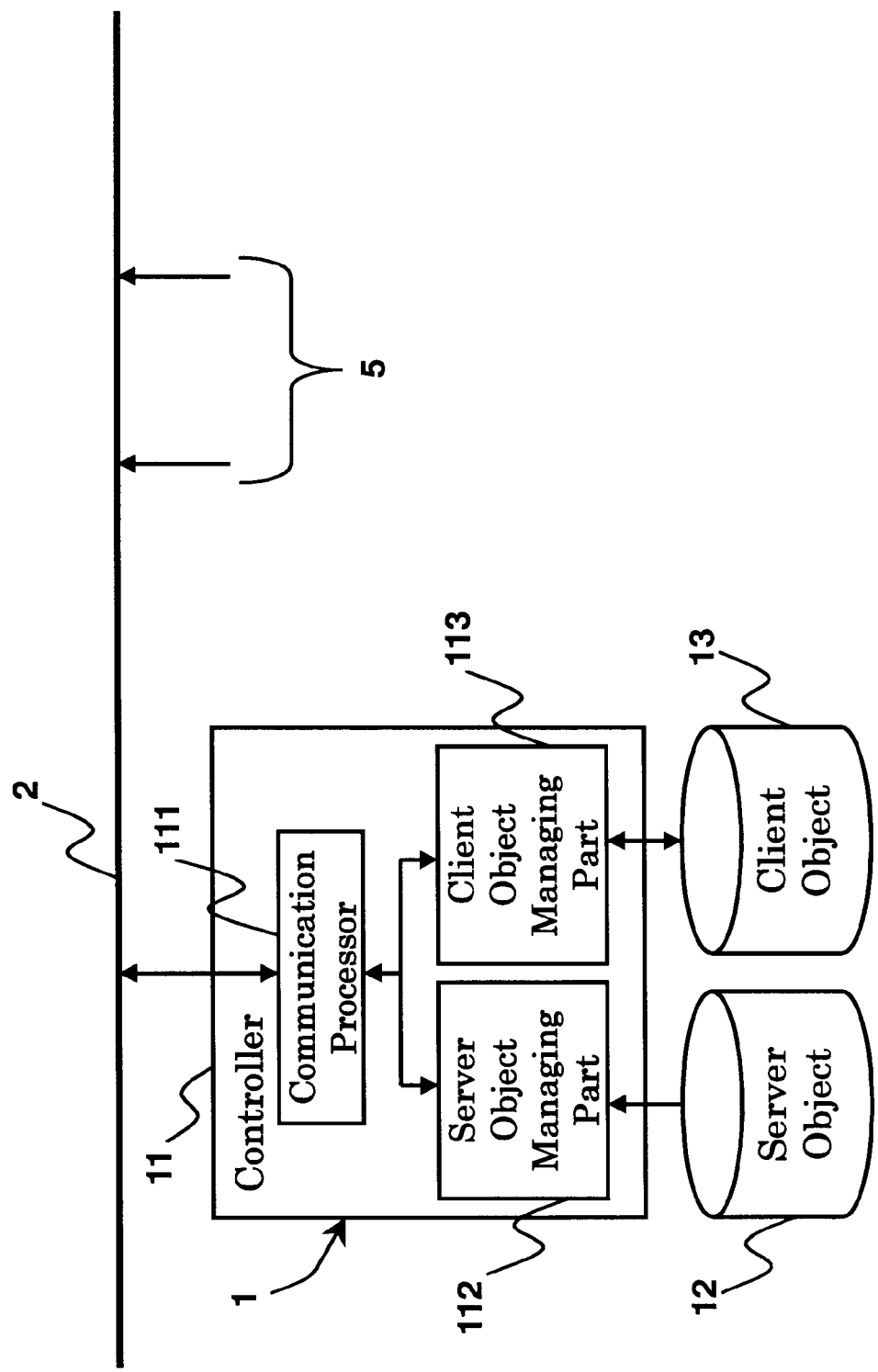
FIG. 1 is a functional block diagram showing the structure of an object management server in a first embodiment of the present invention.

FIG. 1 is a functional block diagram showing an exemplary environment where a software installing apparatus of a first embodiment according to the present invention is realized. In FIG. 1, an object management server 1 is connected to a LAN 2 via a communication processor 111. The LAN 2 is provided with information sockets 5 for linking the object management server 1 to other computers in various places. The information sockets 5 can accept any other computers. The term "computers" as used in this specification includes, in addition to desktop computers, notebook PCs, network terminals, PDAs (Personal Digital Assistant) or the like.

In addition to the controller 11 including the communication processor 111, the object management server 1 includes storage devices for a server object 12 and a client object 13. The server object 12 and the client object 13 are managed by a server object managing part 112 and a client object managing part 113, respectively.

In this embodiment, as described above, each object is stored in an auxiliary storage such as a magnetic disk or the like. However, the object also can be stored in a main storage.

The controller 11 controls the object management server 1 entirely. From the aspect of hardware, the controller 11 corresponds to a CPU, and I/O interfaces between the CPU and the storage devices such as a magnetic disk.

The server object 12 waits for access from another computer in a cooperatively operable software. The client object 13 accesses another computer. The server object 12 and the client object 13 operate in different computers. In this embodiment, the object management server 1 manages the objects, and the objects do not operate on the object management server 1. However, it is possible to allow the objects to operate on the object management server 1.

In response to a request of another computer transmitted via the LAN 2, the communication processor 111 transmits an object requested by the computer. The process procedure of the communication processor 111 will be detailed later.

The server object managing part 112 is an I/O interface between a storage device for storing the server object 12 and the communication processor 111. The sever object managing part 112 gets the server object 12 from the storage device and transmits it to the communication processor 111.

The client object managing part 113 is an I/O interface between a storage device for storing the client object 13 and the communication processor 111. The client object managing part 113 gets the client object 13 from the storage device and transmits it to the communication processor 111.

Next, a process in an environment where the above-described object management server 1 is included and a client PC (hereinafter, also referred to as "PC") 3 on which the server object 12 can operate is connected to the LAN 2 via an information socket 5 will be described.

Figure 2:
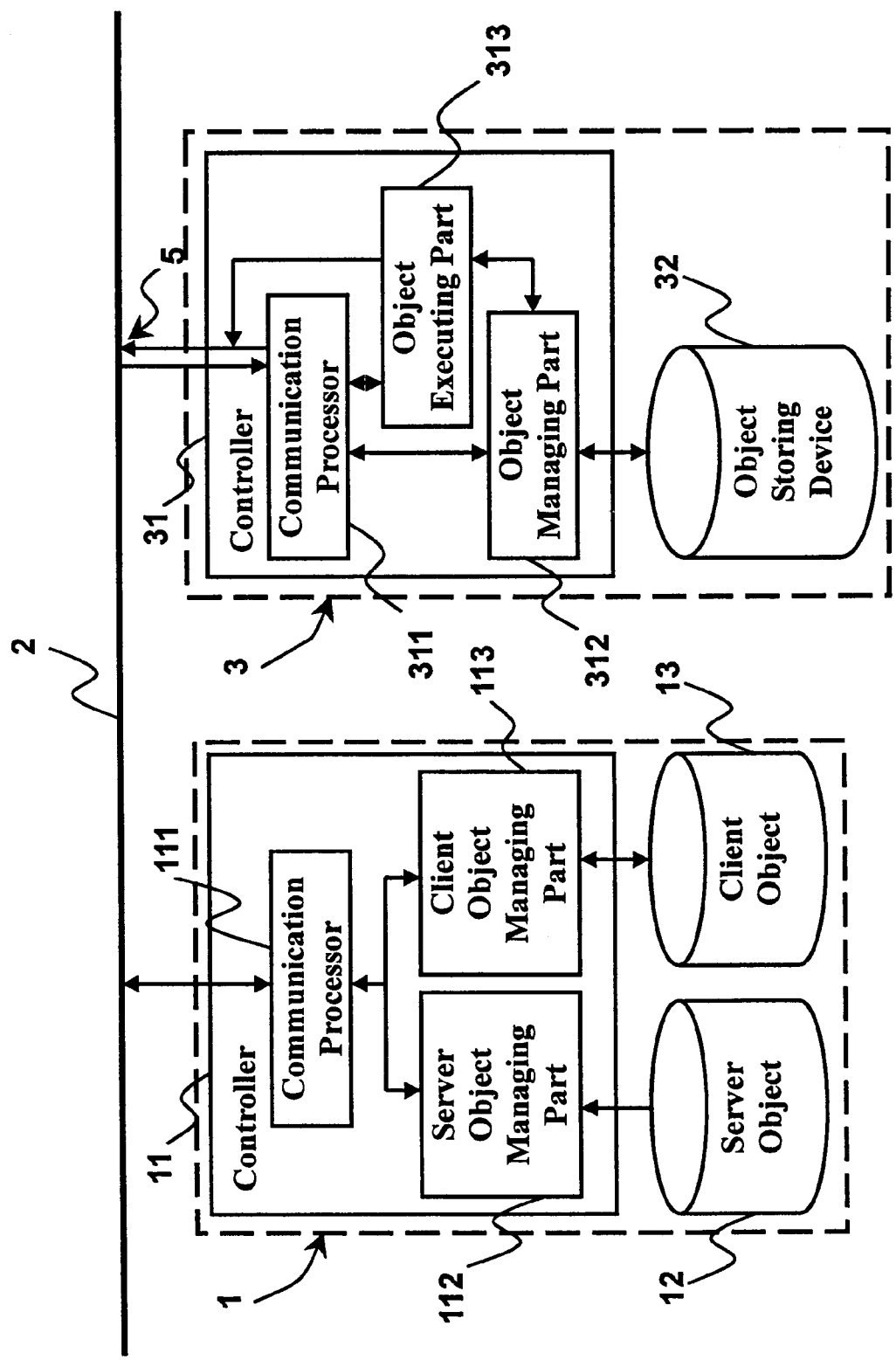
FIG. 2 is a functional block diagram showing the state where a PC 3 on which a server object runs is connected to a LAN 2 in the first embodiment of the present invention.

FIG. 2 is a functional block diagram showing a state where the PC 3 is connected to the LAN 2. As shown in FIG. 2, the PC 3 includes a controller 31 and an object storing device 32.

The controller 31 includes a communication processor 311, an object managing part 312 and an object executing part 313. From the aspect of hardware, the controller 31 corresponds to a CPU and an I/O interface between the CPU and a storage device or the like.

The object storing device 32 stores the sever object 12 transmitted from the object management server 1. In this embodiment, the object is stored in an auxiliary storage such as a magnetic disk or the like, but it also can be stored in a main storage.

The communication processor 311 notifies the object management server 1 that the PC 3 has been connected to the LAN 2, requests it to transmit the server object 12, and receives the server object 12 transmitted from the object management server 1. The processes of the communication processor 311 will be detailed later.

The object managing part 312 is an I/O interface between the object storing device 32 and the communication processor 311 and the object executing part 313, similar to the server object managing part 112 included in the object management server 1. The object managing part 312 stores the server object 12 transmitted from the object management server 1 in the object storing device 32. When starting the server object 12, the object managing part 312 retrieves the server object 12 from the object storing device 32 and transmits it to the object executing part 313.

The object executing part 313 executes the server object 12 transmitted from the object managing part 312.

Figure 3:
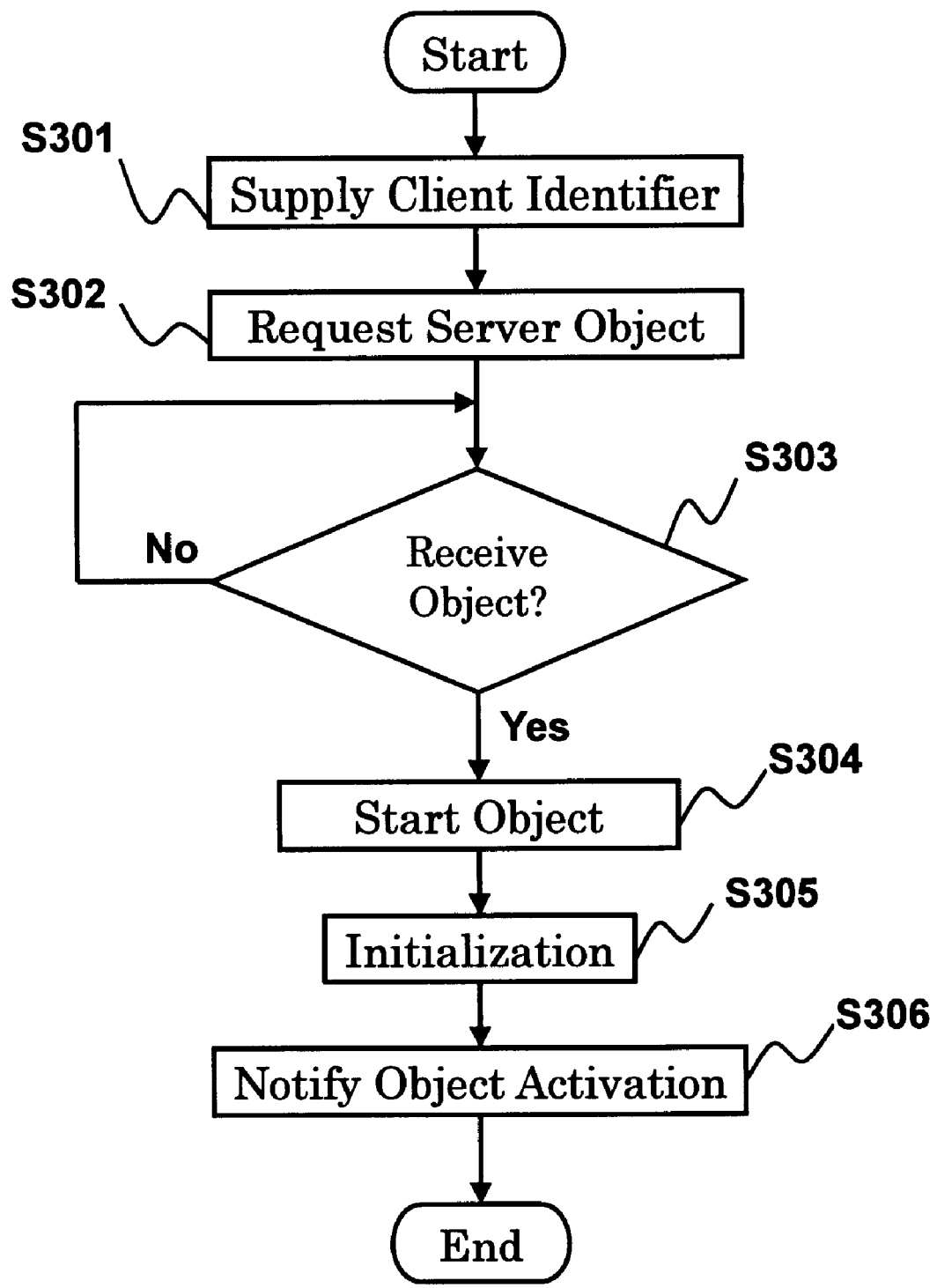
FIG. 3 is a flow chart showing the procedure of a communication processor 311 of the PC 3 when a software installing apparatus is started in the first embodiment of the present invention.

FIG. 3 is a flow chart showing the process procedure of the communication processor 311 of the PC 3 when the software installing apparatus of the present invention is started, in the case where the PC 3 is connected to the information socket 5, and the PC 3 turns on so as to start the software installing apparatus of this embodiment As shown in FIG. 3, the communication processor 311 first supplies the identifier of the computer indicating the PC 3 (hereinafter, "client identifier" is simply referred to as "identifier") to the object management server 1 (S301). Examples of the identifier include an IP address, a MAC address or the like. The identifier can be supplied by utilizing, for example, a broadcast message. The object management server 1 receives the message and supplies a response to the PC 3. The process procedure of the communication processor 111 of the object management server 1 will be described later. Hereinafter, the process procedure of the communication processor 311 of the PC 3 will be more specifically described.

After supplying the identifier of the PC 3, the communication processor 311 requests the object management server 1 to transmit the server object 12 (S302). More specifically, the communication processor 311 transmits a message for a request to transmit the server object.

When the communication processor 311 receives the server object 12 transmitted from the object management server 1 in response to the request (S303: Yes), the communication processor 311 stores the server object 12 in the server object storing device 32 via the object managing part 312. Furthermore, the communication processor 311 instructs the server object executing part 313 to start the server object 12 (S304) and to perform an initialization process (S305).

After supplying the instruction of the initialization process, the communication processor 311 notifies the object management server 1 that the object has been started (S306). This notification allows the object management server 1 to recognize the start of the server object 12 on the PC 3.

Figure 4:
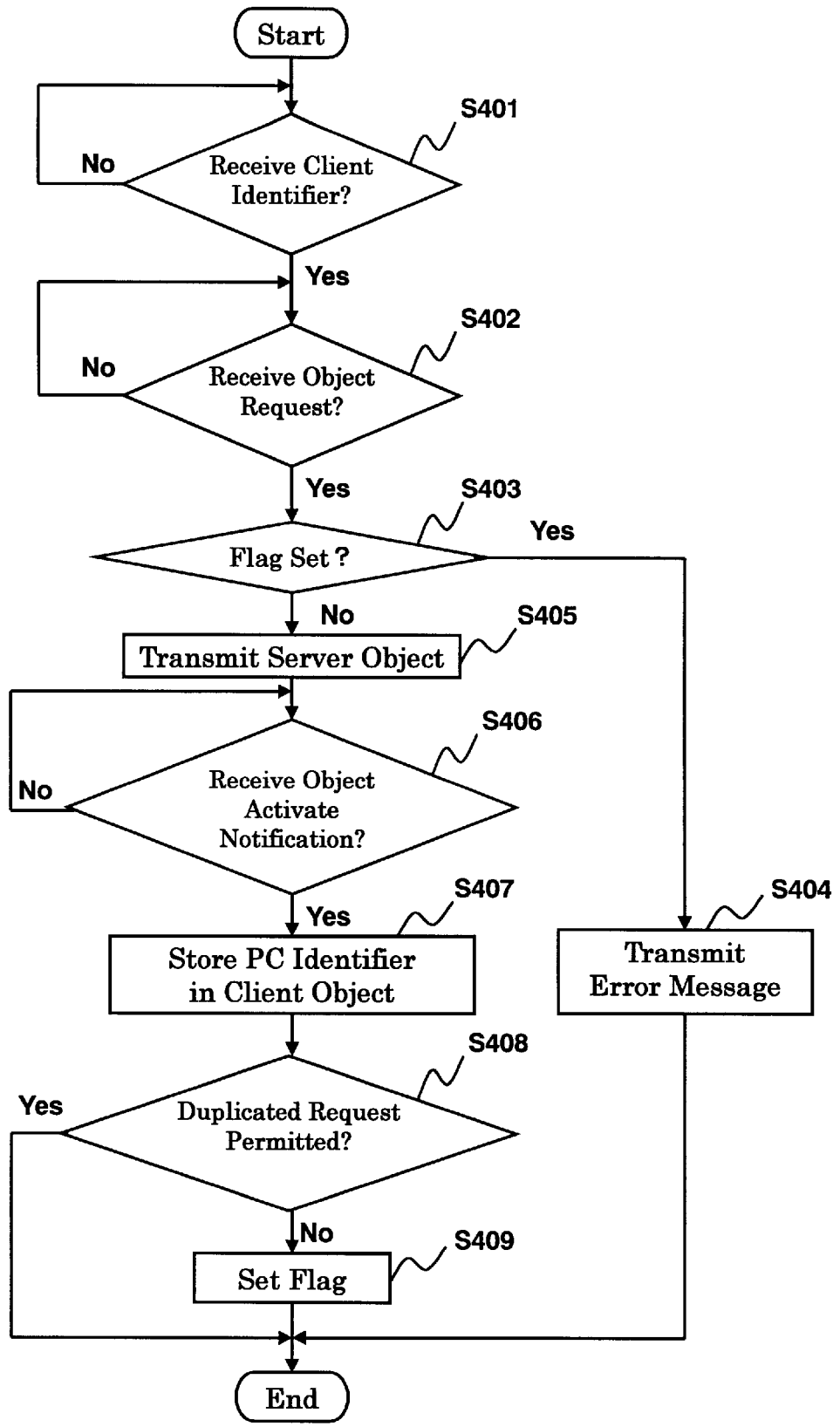
FIG. 4 is a flow chart showing the procedure of a communication processor 111 of the object management server 1 when the PC 3 is connected to the LAN 2 in the first embodiment of the present invention.

Next, the process procedure of the communication processor 111 of the object management server 1 during the above-described process of the communication processor 311 of the PC 3 will be described. FIG. 4 is a flow chart showing the procedure of the communication processor 111 during that process.

The communication processor 111 first receives the identifier of the PC 3 (S401: Yes). Thereafter, upon the reception of a request to transmit the server object 12 from the PC 3 (S402: Yes), the communication processor 111 determines whether or not a flag is set (S403). This flag indicates whether or not the requested object is permitted to be transmitted on a duplicated request, which will be detailed later. When the flag is set (S403: Yes), the communication processor 111 transmits an error message to the PC 3 (S404), and then the process ends.

When the flag is not set (S403: No), the communication processor 111 transmits the server object 12 to the PC 3 (S405).

Thereafter, upon the reception of the notification that the object has been started from the PC 3 (S406: Yes), the communication processor 111 stores the identifier of the PC 3, where the server object 12 is started, in the client object 13 (S407).

Figure 5:
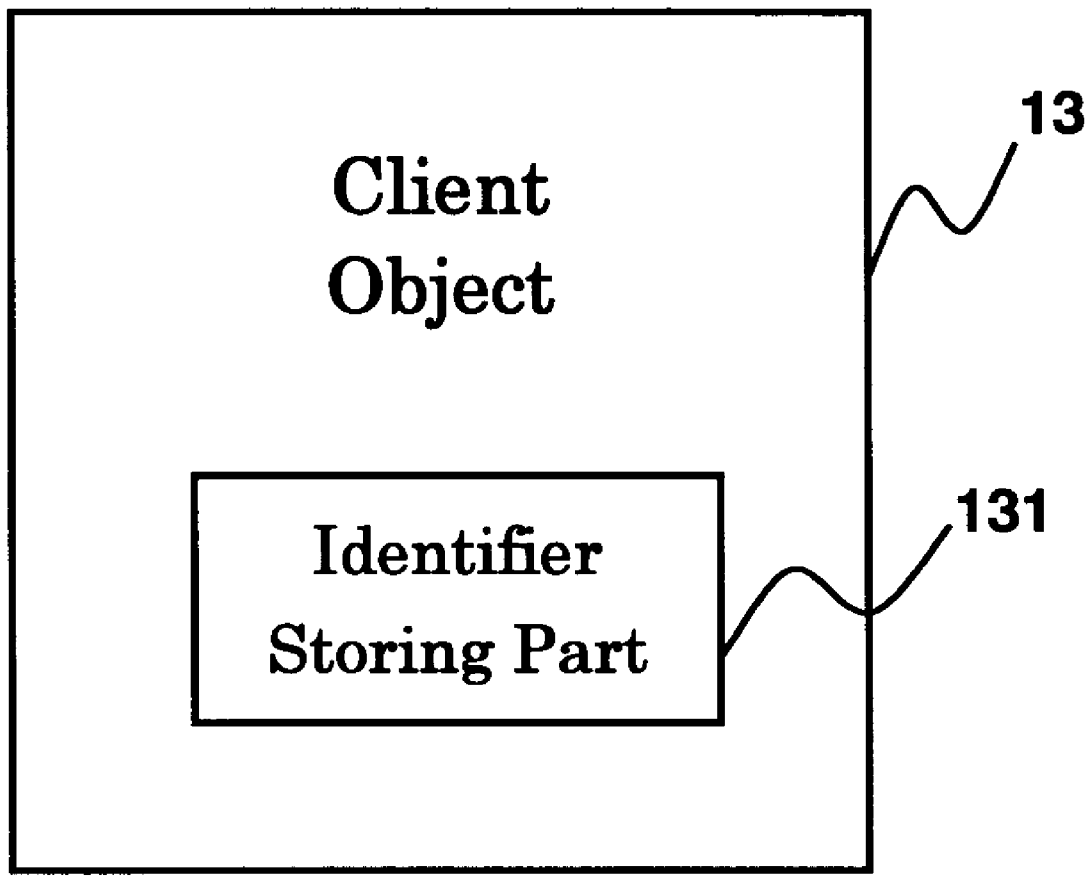
FIG. 5 is a schematic diagram showing the content of a client object of the present invention.

FIG. 5 schematically shows the client object 13 of this embodiment of the present invention. As shown in FIG. 5, the client object 13 of this embodiment includes an area for storing the identifiers of client PCs where the server object 12 is started as an identifier storing part 131. An example of the identifiers of the client PCs is an IP address.

The storage of the identifiers makes it easy to identify the PC where the server object 12 is started when the client object 13 is transmitted and started in another client PC. In this embodiment, the case where the client object 13 includes the identifier storing part 131 from the outset is described. A method for applying the present invention to the case where the identifier storing part 131 is not included, as in the case where a commercially available object is used, will be described later.

Thereafter, the communication processor 111 of the object management server 1 determines whether or not the server object 12 is permitted to be transmitted on a duplicated request from other computers (S408). Herein, "duplicated request" refers to a request to transmit the server object by a computer other than the computer on which the server object has already operated. It is determined whether or not the server object 12 is permitted to be transmitted on a duplicated request with reference to information included in the server object 12. More specifically, in a service where one server object 12 suffices in the place of interest (e.g., an object indicating whether or not a printer is busy), information prohibiting a request from being duplicated is included in the server object 12 so that the server object 12 can be transmitted to a client PC that first requests or a PC that has a specific client identifier.

When the duplicated request is permitted to be complied with (S408: Yes), no further process is performed. When the duplicated request is prohibited from being complied with (S408: No), a flag is set (S409) so that the server object 12 is prevented from being transmitted to other PCs at S403, and the process ends.

Figure 6:
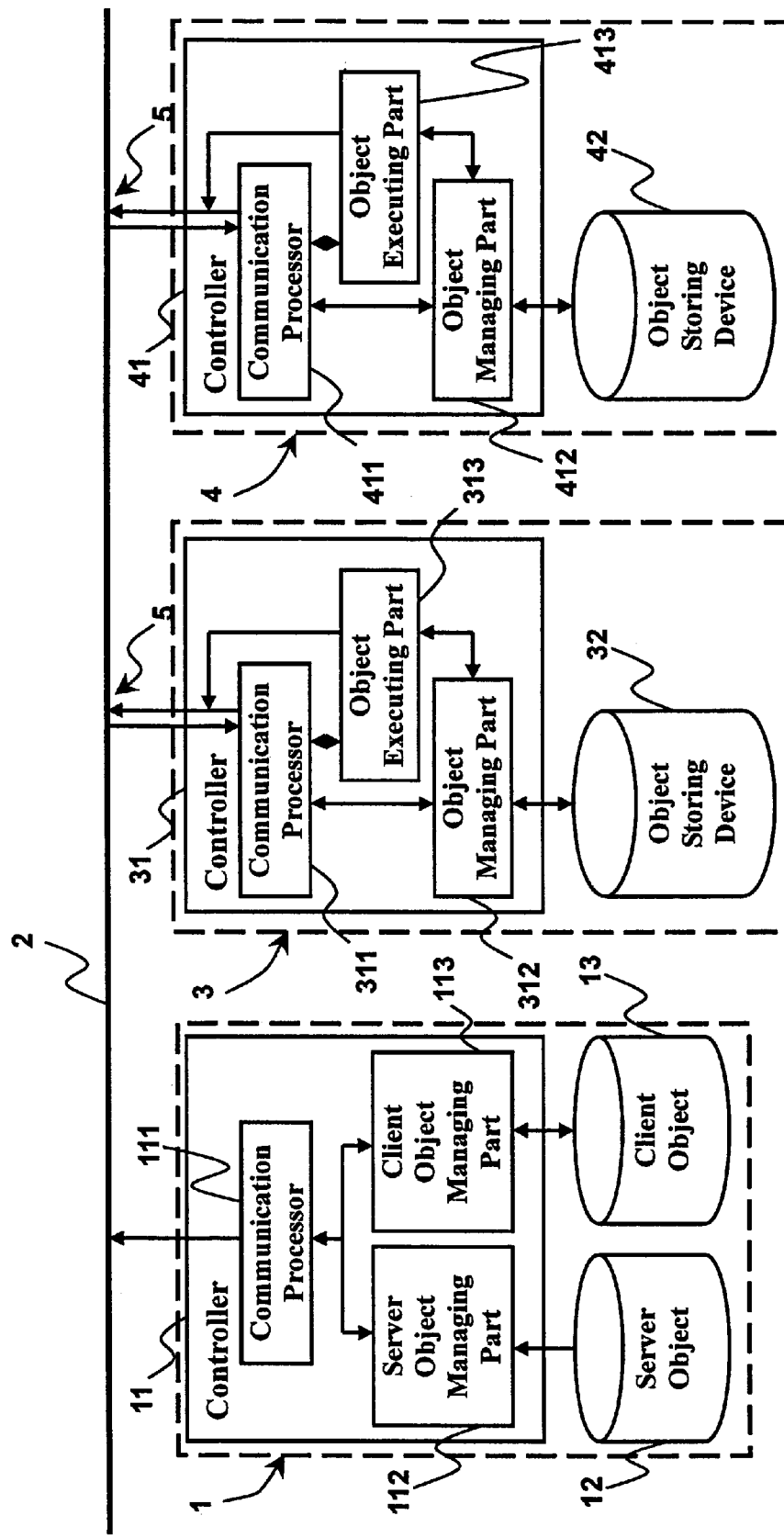
FIG. 6 is a functional block diagram showing the state where a PC 4 on which a client object runs is connected to the LAN 2 in the first embodiment of the present invention.

Next, the case where the server object 12 is already started on the PC 3 and another PC 4 on which the client object 13 can operate is connected to the LAN 2 will be described. FIG. 6 is a functional block diagram showing the structure where the PC 3 already has started the server object 12 and the PC 4 is connected to the LAN 2 via the information socket 5.

The components of the PC 4 are not further described because they are the same as those of the PC 3. However, as described above, the PC 4 of this embodiment is a PC on which the client object 13 can start, so that the process procedure executed by a communication processor 411 is different from that of the communication processor 311 of the PC 3.

Hereinafter, the process procedure of the communication processor 411 of the PC 4 in the case where the server object 12 already has operated on the PC 3 will be described.

Figure 7:
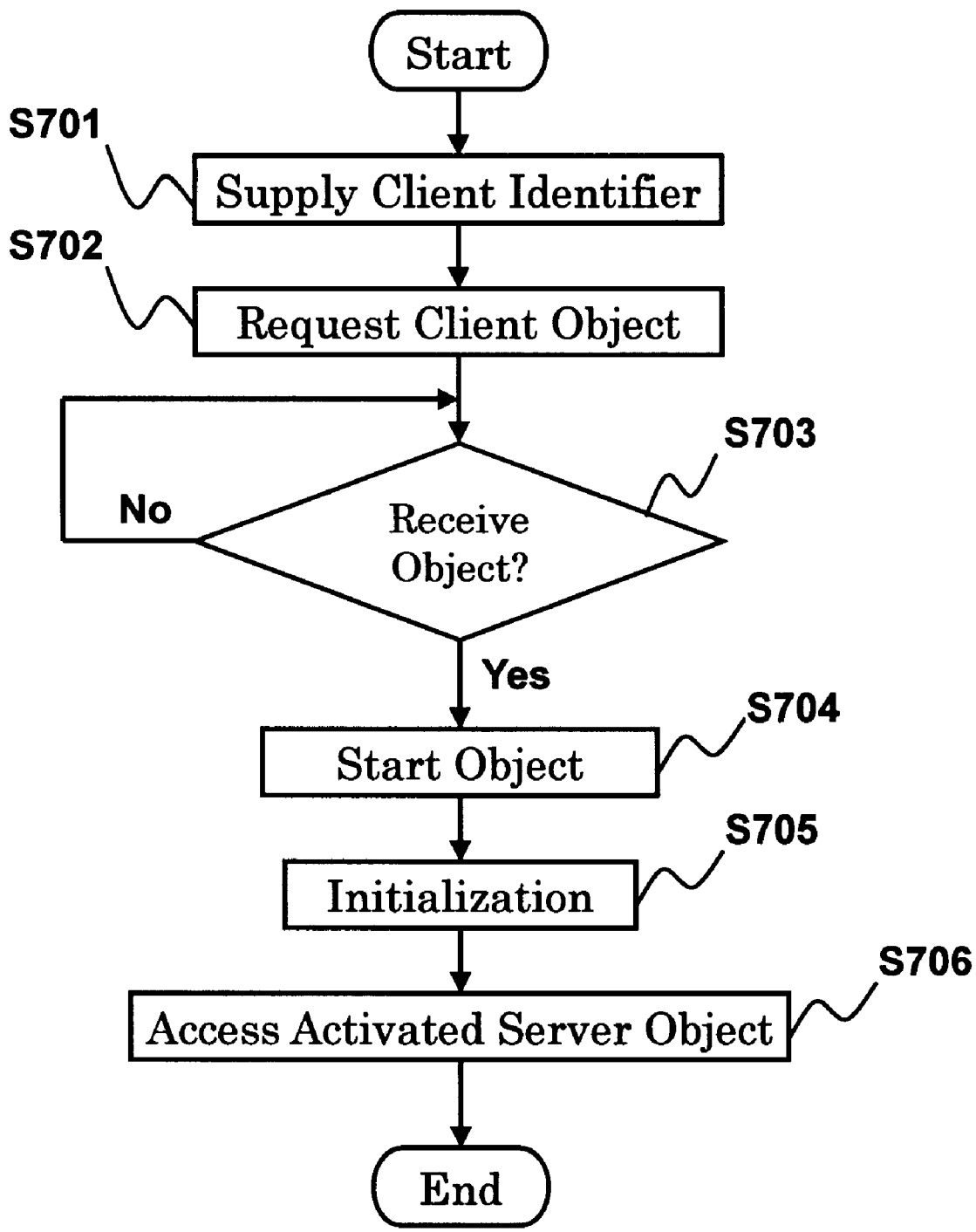
FIG. 7 is a flow chart showing the procedure of a communication processor 411 of the PC 4 when a software installing apparatus is started in the first embodiment of the present invention.

FIG. 7 is a flow chart showing the process procedure of the communication processor 411 of the PC 4 during the operation of the software installing apparatus. In this embodiment, the software installing apparatus starts at the time when the PC 4 turns on in the same manner as the PC 3.

As shown in FIG. 7, the communication processor 411 supplies the identifier of the computer indicating the PC 4 to the object management server 1 (S701). The identifier can be supplied by utilizing, for example, a broadcast message, as in the case of the PC 3. The object management server 1 receives the message and responds to the PC 4. The process procedure of the communication processor 111 of the object management server 1 will be described later. Hereinafter, the process procedure of the communication processor 411 will be more specifically described.

After supplying the identifier of the PC 4, the communication processor 411 requests the object management server 1 to transmit the client object 13 (S702). In this case, unlike the PC 3, the communication processor 411 transmits a message for a request to transmit the client object. The type of the message indicates which object is requested to be transmitted.

When the communication processor 411 receives the client object 13 transmitted from the object management server 1 in response to the request (S703: Yes), the communication processor 411 instructs the server object executing part 413 to start the client object 13 (S704) and to perform an initialization process (S705).

After the initialization process is complete, the communication processor 411 accesses the PC 3 where the server object 12 is started (S706). The communication processor 411 accesses the PC 3 with reference to the identifiers stored in the identifier storing part 131 of the client object 13. In other words, by using the software installing apparatus of this embodiment, it is possible to directly access the PC 3 without via the object management server 1.

In this embodiment, the communication between the server object 12 and the client object 13 is performed by the communication procedure programmed in each object, so that the communication processors 311 and 411 do not participate in this communication.

Figure 8:
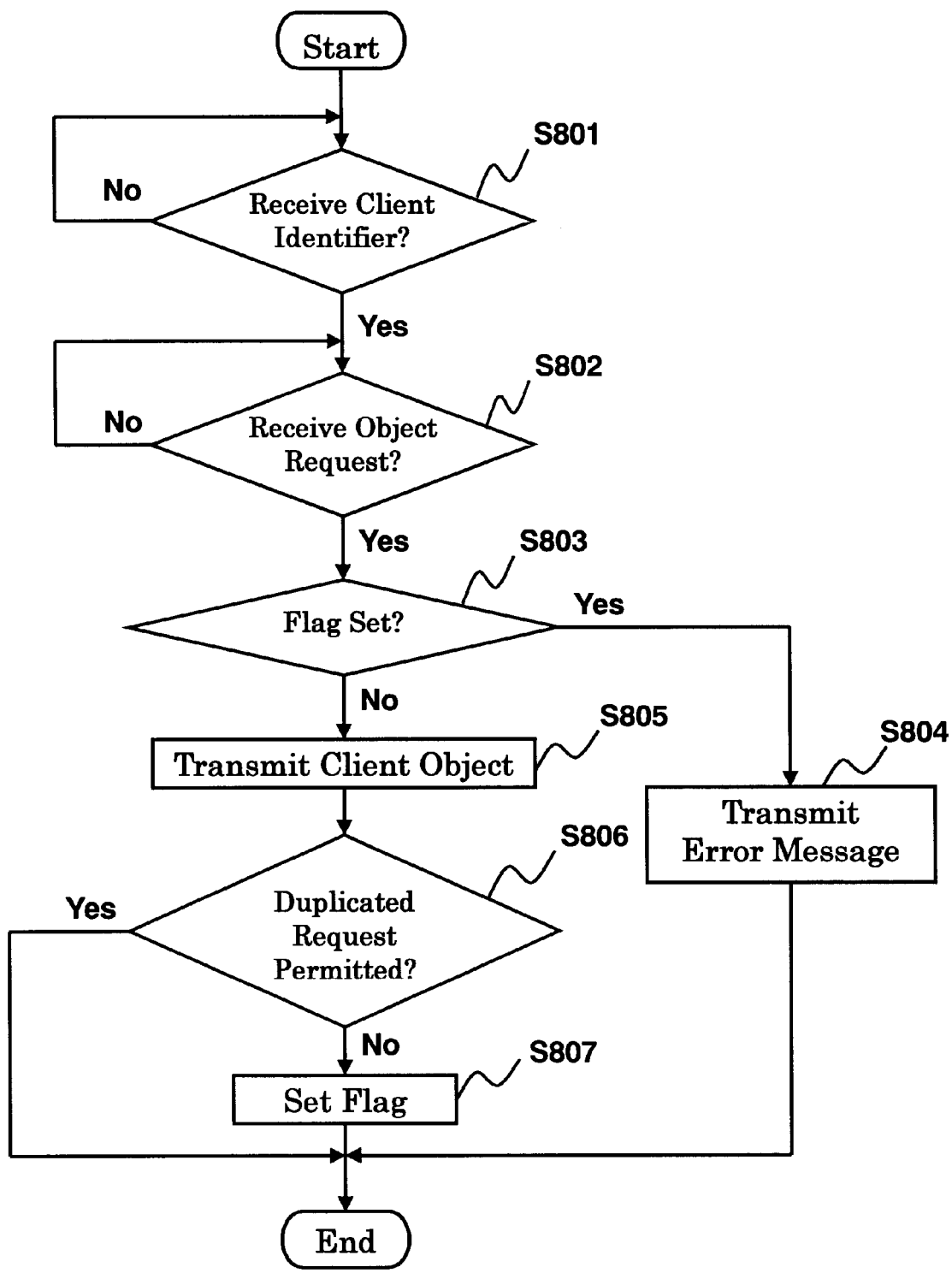
FIG. 8 is a flow chart showing the procedure of a communication processor 111 of the object management server 1 when the PC 4 is connected to the LAN 2 in the first embodiment of the present invention.

Next, the process procedure of the communication processor 111 of the object management server 1 during the above-described process of the PC 4 will be described. FIG. 8 is a flow chart showing the process procedure of the communication processor 111 during that process.

The communication processor 111 first receives the identifier of the PC 4 (S801: Yes). Thereafter, upon the reception of a request to transmit the client object 13 from the PC 4 (S802: Yes), the communication processor 111 determines whether or not a flag is set (S803), as in the case of the transmission of the server object 12. When the flag is set (S803: Yes), the communication processor 111 transmits an error message to the PC 4 (S804), and then the process ends.

When the flag is not set (S803: No), the communication processor 111 transmits the client object 13 to the PC 4 (S805).

Thereafter, the communication processor 111 of the object management server 1 determines whether or not the client object 13 is permitted to be transmitted again on a duplicated request from other computers (S806).

When the duplicated request is permitted to be complied with (S806: Yes), no further process is performed. When the duplicated request is prohibited from being complied with (S806: No), a flag is set (S807) so that the client object 13 is prevented from being transmitted to other PCs, and the process ends.

As described above, by using the software installing apparatus according to the present invention, it is possible to automatically set information about the PC where the server object 12 is running, which is needed for operating the client object 13. Therefore, it is not necessary for users to set parameters when they move their PCs in other places. Thus, a cooperatively operable software program can be easily used, even in an environment where the users can connect or disconnect the terminals to the network frequently.

Furthermore, the communication between the objects with cooperative procedures is performed by a communication program included in the objects regardless of the communication method between the client PCs and the object management server. Furthermore, after the object starts, the object operates independently of the software installing apparatus of the present invention until the operation ends. Therefore, even when the software installing apparatus undergoes an error, the service can continuously be provided without being influenced by the error of the software installing apparatus.

If various parameters of the object management server are saved, it is possible to recover a previous state by restarting the software installing apparatus. Therefore, the present invention can provide a robust system.

Figure 9:
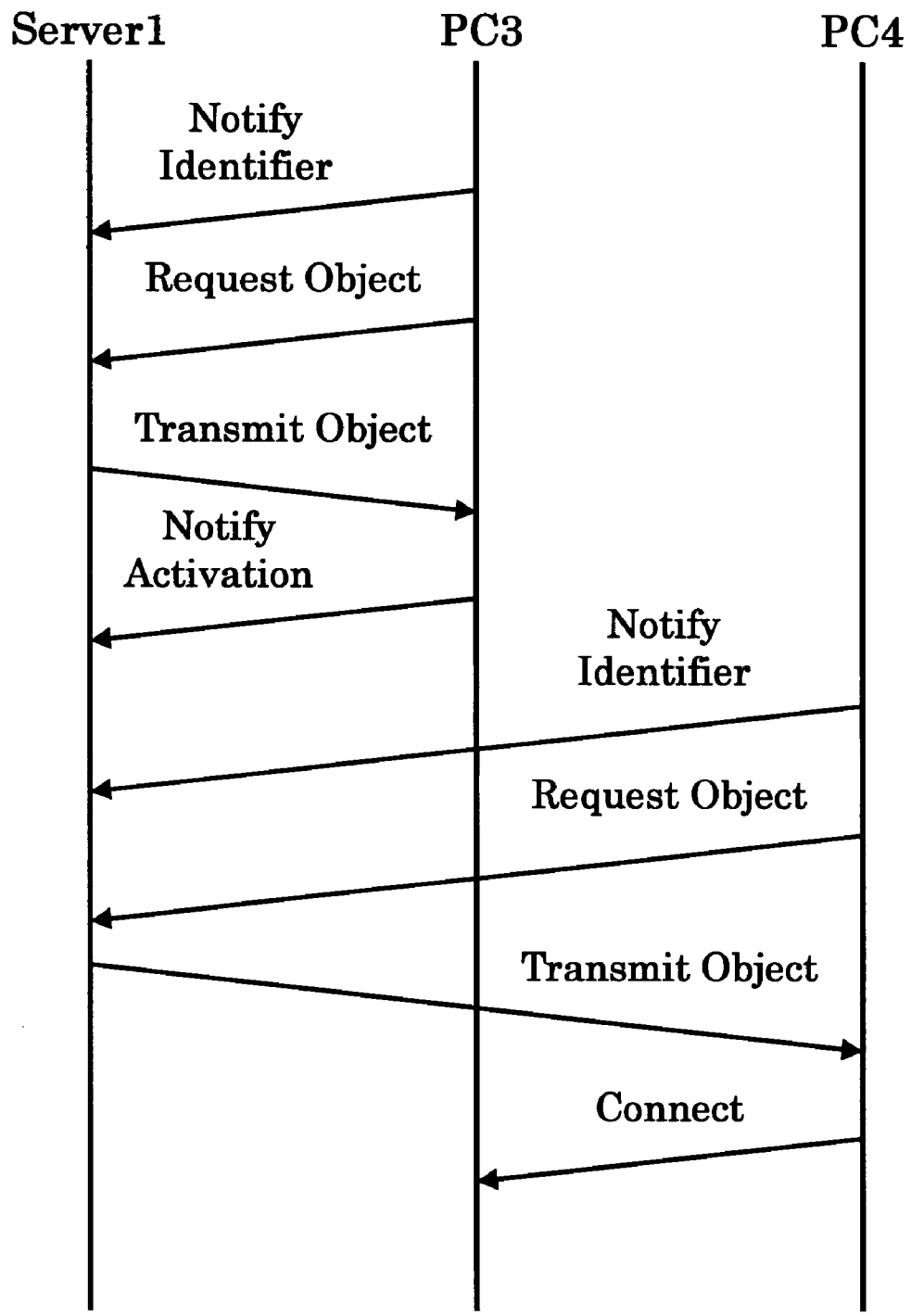
FIG. 9 is a timing chart showing the sequence of communication between the object management server 1, the PC 3 and the PC 4 over time from the notification of the identifier of the PC 3 upon the connection of the PC 3 to the LAN 2 to the completion of the link between the PC 3 and the PC 4 in the first embodiment of the present invention.

FIG. 9 is a timing chart showing a sequence of communication between the object management server 1, the PCs 3 and 4 from the time when the PC 3 is connected to the LAN 2, and the identifier of the PC 3 is notified until the time when the PC 4 is linked to the PC 3.

Next, the process where the cooperative operation between the server object 12 and the client object 13 between the PC 3 and the PC 4 is terminated will be described below.

First, the communication processors 311 and 411 supply end notifications to the server object 12 and the client object 13 that are started on the PC 3 and PC 4, respectively. Since the server object 12 and the client object 13 operate cooperatively, a process for ending the communication between the server object 12 and the client object 13 is performed in response to the end notification. Then, an end process is performed for each object.

Furthermore, the communication processors 311 and 411 supply end notifications of the objects to the object management server 1.

Upon the reception of the end notification, the communication processor 111 of the object management server 1 resets a flag that was set at S407 and S805 for the object that cannot respond to a duplicated request from other computer. This reset process enables a new object transmission request from other computers to be complied with.

Second Embodiment

Next, a second embodiment of the present invention will be described with reference to the accompanying drawings.

In this embodiment, the present invention is applied to a commercially available object that does not include the identifier storing part 131.

Figure 10A:
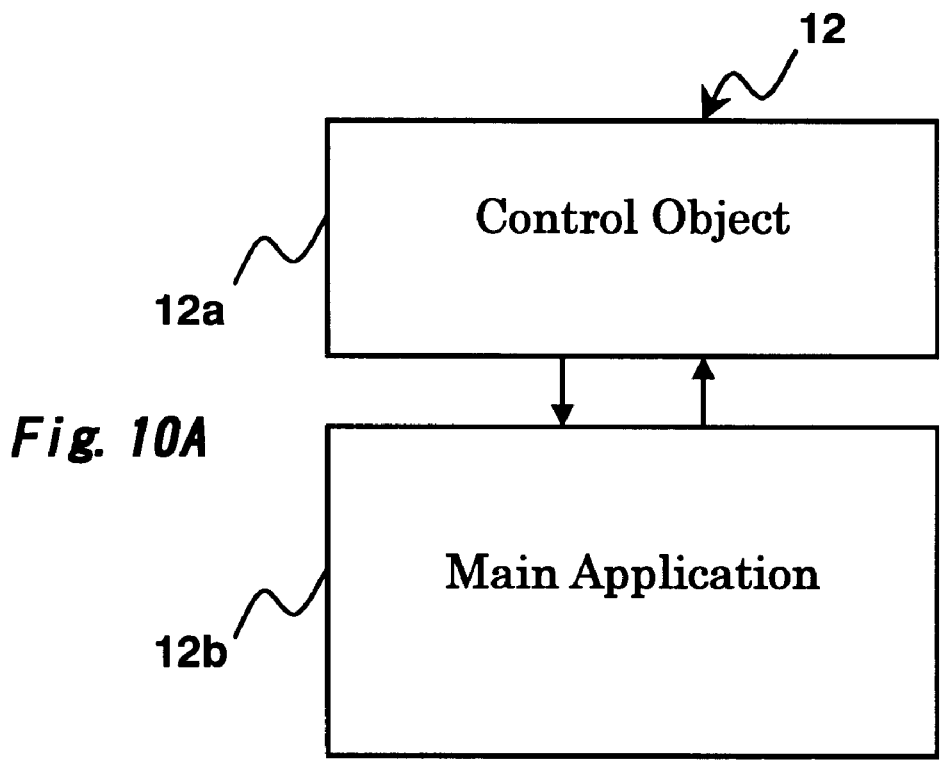
FIG. 10A is a schematic diagram of a server object in a second embodiment of the present invention.
Figure 10B:
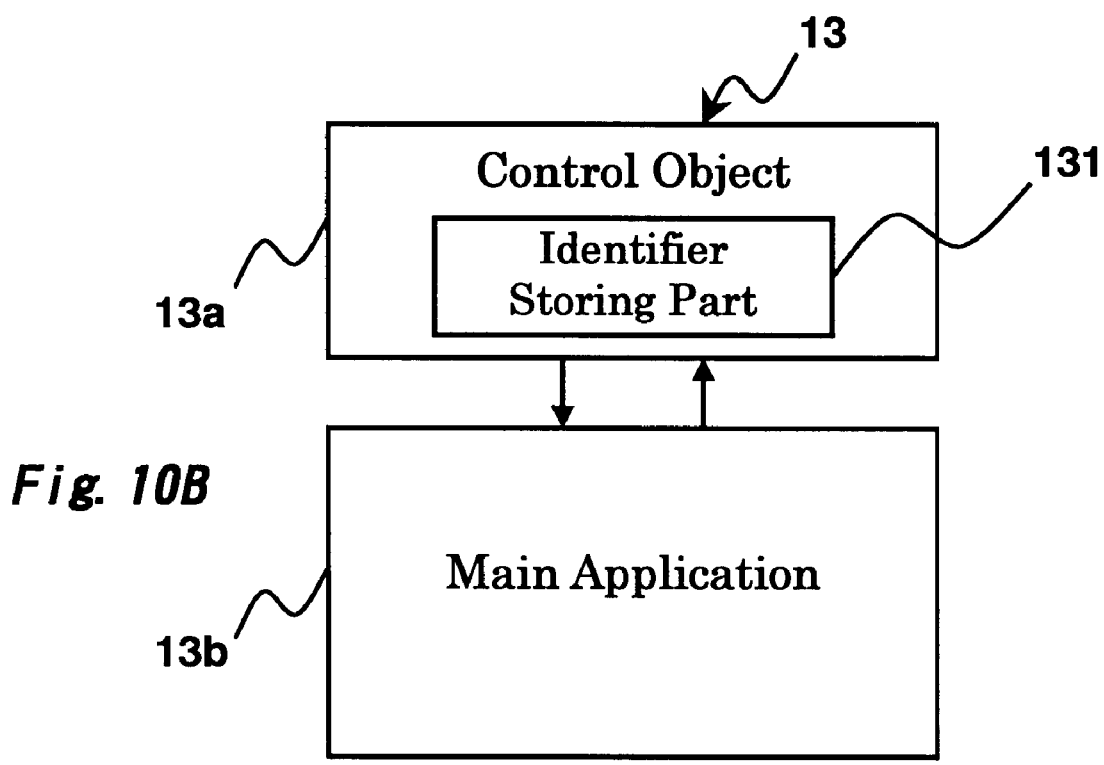
FIG. 10B is a schematic diagram of a client object in the second embodiment of the present invention.

FIGS. 10A and 10B are schematic diagrams showing the structure of the server object 12 and the client object 13 in this embodiment. FIG. 10A shows the structure of the server object 12, and FIG. 10B shows the structure of the client object 13. As shown in FIG. 10A, the server object 12 in this embodiment includes a control object 12a and a main application 12b. As shown in FIG. 10B, the client object 13 in this embodiment includes a control object 13a and a main application 13b. The control object 13a includes the identifier storing part 131, The main applications 12b and 13b are commercially available applications that do not include the identifier storing part 131.

The control objects 12a and 13a are objects that are newly produced in this embodiment for staring the main applications 12b and 13b. More specifically, the main applications 12b and 13b are started by the control objects 12a and 13a by using a function of linking applications such as OLE (Object Tinking and Embedding), OLE 2.

The process procedures of the object management server 1 and the PCs 3 and 4 are the same as those in the first embodiment, except that the main applications 12b or 13b are started by the control objects 12a or 13a. Furthermore, for the start of the client object 13, the identifier of a linked PC stored in the identifier storing part 131 is transmitted as a parameter for the control object 13a to start the main application 13b, so that the main application 13b is linked directly to the main application 12b of the server object 12.

Since the control object generally receives a start notification from the main application, the control object is aware of the state of the main application.

At the end of the operation, in the case where an end notification is supplied from the main application to the control object, the control object that received the end notification notifies the object management server 1 of the end of the operation.

On the other hand, in the case where the main application does not notify the object management server 1 of the end of the operation, the control object periodically confirms that the main application is under operation so as to detect the end of the main application.

The following methods can be used to confirm that the main application is under operation: 1) make a query to the OS whether the main application is in the memory; or 2) send a message to which the main application should respond (in this case, it is necessary to use a message that does not influence the operation of the main application, for example a query as to who is the other side of the connection).

At the time when the control object detects by one of the above-mentioned methods that the main application is out of operation, the control object supplies an end notification to the object management server 1.

The above-mentioned methods can be applied for objects that can link applications. For objects that have no such function, the present invention also can be applied when a function of simulating the procedure of a user operating the object of interest (e.g., the procedure of inputting with a mouse, a keyboard or the like for the start of the object) is provided.

Third Embodiment

Next, a third embodiment of the present invention will be described with reference to the accompanying drawings.

Figure 11:
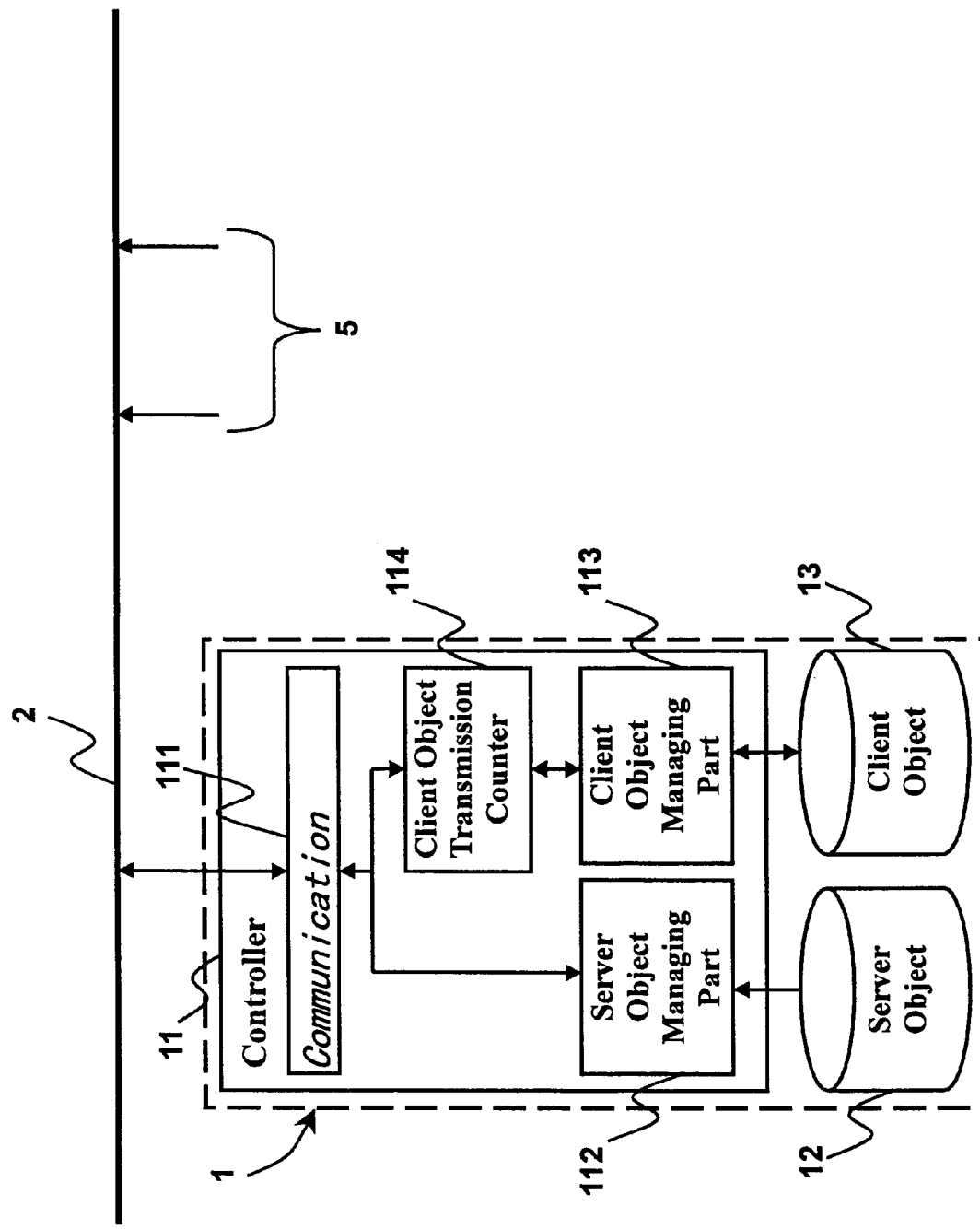
FIG. 11 is a functional block diagram showing the structure of an object management server in a third embodiment of the present invention.

FIG. 11 is a functional block diagram showing the structure of the object management server 1 of this embodiment. As shown in FIG. 11, in the object management server 1 of this embodiment, the controller 11 includes a client object transmission counting part 114. The client object transmission counting part 114 includes a request counter, transmits the client object 13 to each of a plurality of computers that request the client object 13 and keeps track of how many times the client object 13 is requested for transmission. In other words, the client object 13 of this embodiment is necessarily transmitted in response to requests from a plurality of computers.

Hereinafter, the software installing apparatus of this embodiment will be described in the case where the object management server 1 shown in FIG. 11 is used and where the server object 12 starts on the PC 3 as shown in FIG. 2 and then the PC 4 is connected to the LAN 2 as shown in FIG. 6.

Figure 12:
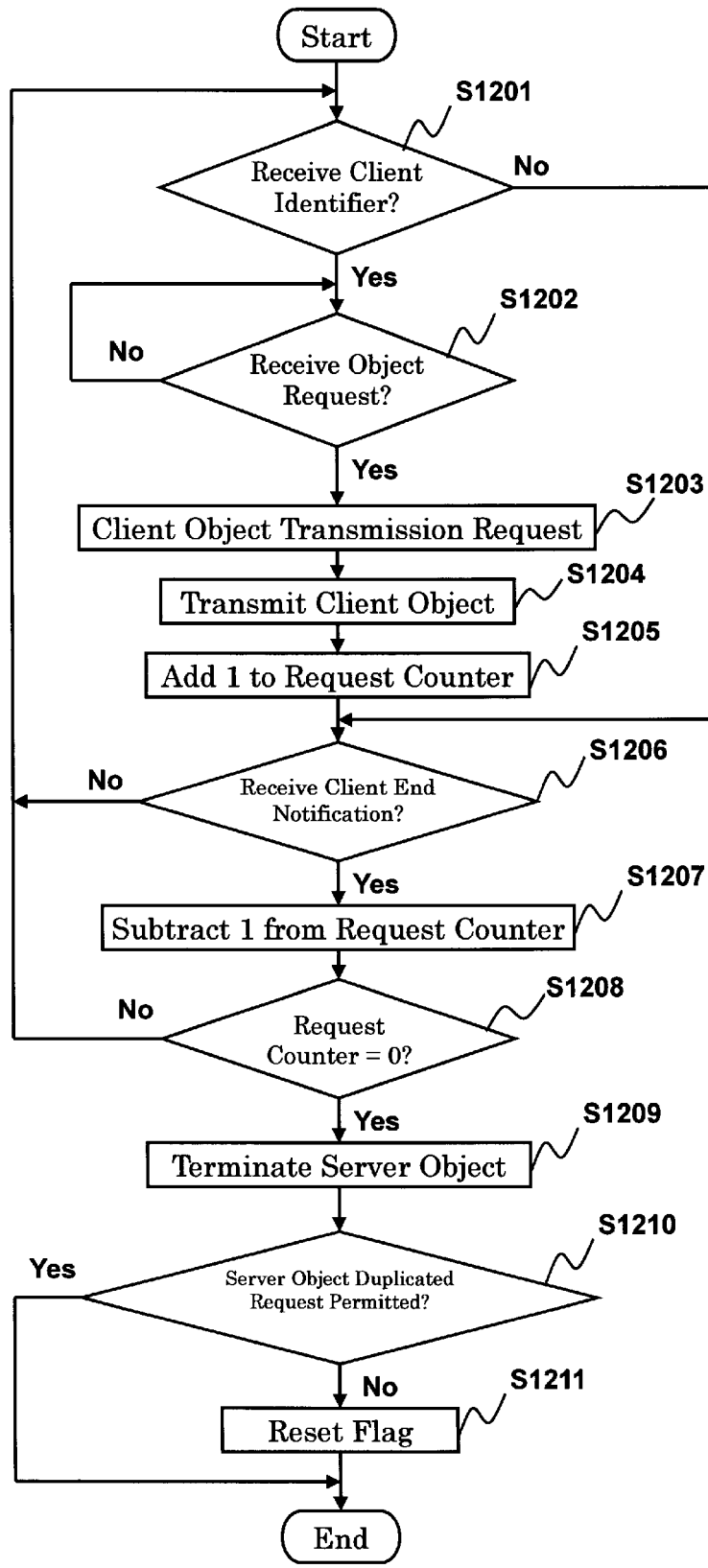
FIG. 12 is a flow chart showing the procedure of a communication processor 111 of the object management server 1 in the third embodiment of the present invention.

FIG. 12 is a flow chart showing the process procedure of the controller 11 of the object management server 1 in the case where the PC 4 is connected to the LAN 2.

In this embodiment, the communication processor 111 receives the identifier of the PC 4 (S1201: Yes). In the case where the client object 13 is requested by the PC 4 (A1202: Yes), the communication processor 111 of the object management server 1 requests the client object transmission counting part 114 to transmit the client object 13 (S1203). The client object transmission counting part 114 transmits the client object 13 to the PC 4 (S1204) and adds a value of 1 to the request counter (S1205).

On the other hand, in the case where the communication processor 111 does not receive the identifier of the PC 4 (S1201: No), the communication processor 111 determines whether or not an end notification is received from other PCs such as the PC 4 (S1206). In the case where an end notification is received, the client object transmission counting part 114 subtracts a value of 1 from the request counter (S1207).

As described above, the object management server 1 of this embodiment can manage the number of PCs on which the client object 13 operates. Since the client module 13 includes the identifier storing part 131, the client object 13 can access the server object 12 without the object management server 1.

Thereafter, the client object transmission counting part 114 determines whether or not the value of the request counter becomes zero (S 1208). In the case where the value of the request counter is zero (S1208: Yes), this indicates that there are no client PCs on which the client object 13 runs, so that the operation of the server object 12 is terminated (S1209). In the case where a duplicated request for the server object 12 is not permitted (S1210: No), the flag that was set in S408 and S 806 is reset (S1211). This reset process enables the server object to be transmitted in response to a new transmission request from other client PCs.

As described above, by using the software installing apparatus of this embodiment, in the case where the server object 12 runs only on a single PC, and the client object 13 runs on a plurality of PCs, it is possible to facilitate the management of the PC on which the server object 12 runs.

Fourth Embodiment

Next, a fourth embodiment of the present invention will be described with reference to the accompanying drawings.

Figure 13:
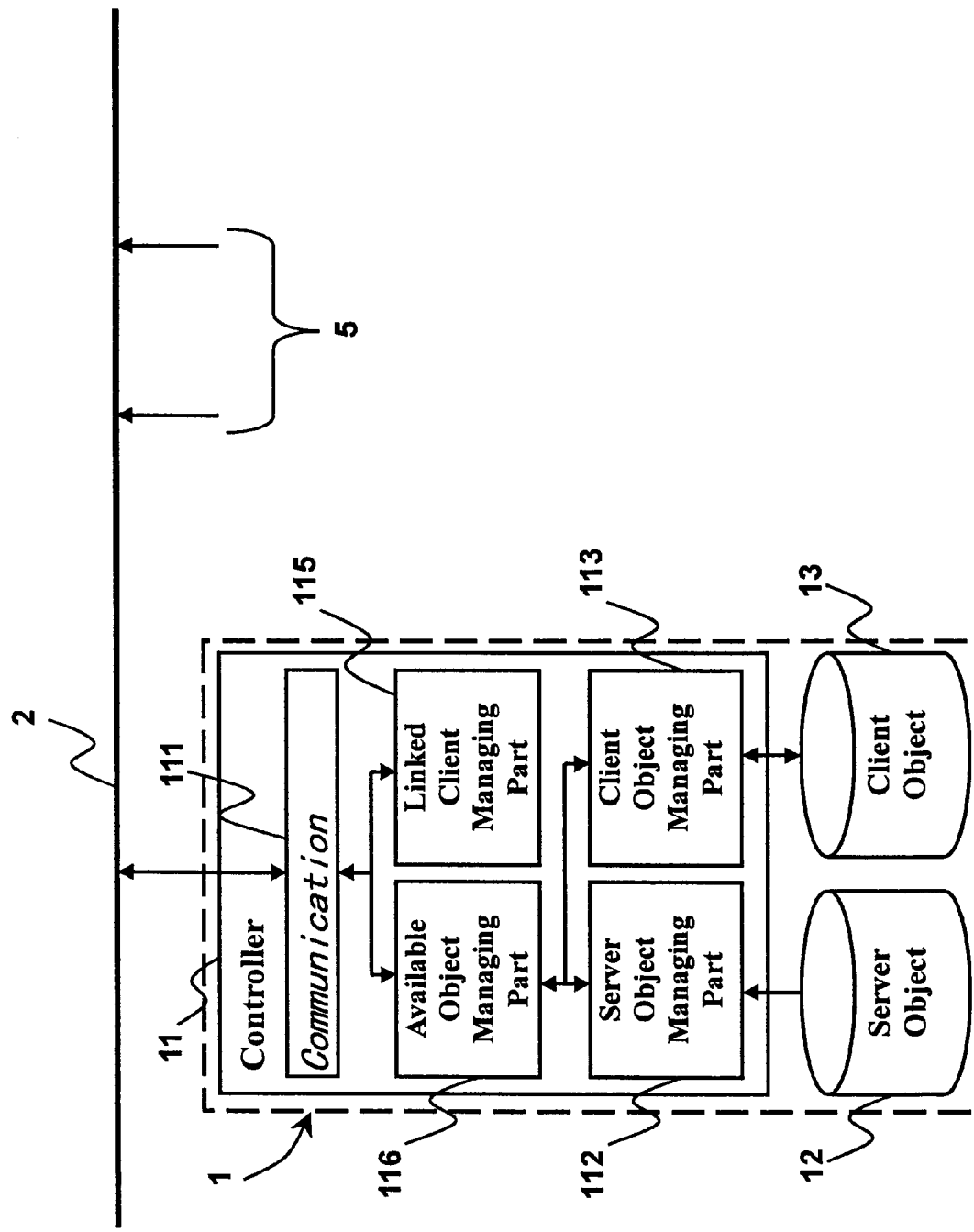
FIG. 13 is a functional block diagram showing the structure of an object management server 1 in a fourth embodiment of the present invention.

FIG. 13 is a functional block diagram showing the structure of the object management server 1 of this embodiment. As shown in FIG. 13, in the object management server 1 of this embodiment, the controller 11 includes a linked client managing part 115 and an available object managing part 116.

The linked client managing part 115 manages client PCs that are linked to the object management server 1. More specifically, the linked client managing part 115 acquires the client identifier transmitted from the client PC via the communication processor 111 and stores it in a linked client identifier table. FIGS. 14A and 14B show an exemplary content of the linked client identifier table. FIG. 14A shows the case where the MAC address of the PC is used as the identifier, and FIG. 14B shows the case where the IP address of the PC is used as the identifier. In this embodiment, MAC addresses of the PCs linked to the object management server 1 are sequentially stored as the identifiers in the form shown in FIG. 14A. However, some other embodiments use IP addresses.

Furthermore, the linked client managing part 115 deletes the identifier of the PC that is disconnected from the object management server 1 from the linked client identifier table.

The available object managing part 116 manages objects that can be used by each client PC by using an available object managing table. More specifically, an object available to a PC linked to the object management server 1 is searched from the available object table. When an object is available, it is transmitted to the client PC.

FIGS. 15A, 15B and 16 show an exemplary content of the available object management table. FIGS. 15A and 15B are management tables for available server objects. As shown in FIG. 15, in this embodiment, the available server objects are managed by using the two tables.

In the table shown in FIG. 15A, object names of server objects that can be supplied from the object management server 1 and object names of the client objects corresponding to the server objects are stored permanently. In this embodiment, the server object names are identical to the client object names. This is because the server object and the client object are often supplied under the same name in a cooperatively operable software. The server object names can be different from the client object names.

In the table shown in FIG. 15B, the object names of running server objects and the identifiers of the corresponding computers on which the server objects run are stored dynamically.

When the object management server 1 receives a request to transmit a server object, it determines whether or not the requested server object is available with reference to the table shown in FIG. 15A. When the object management server 1 receives a request to transmit a client object, it determines whether or not the server object corresponding to the requested client object is already under operation with reference to the tables shown in FIGS. 15A and 15B.

On the other hand, FIG. 16 is a management table for available client objects. As shown in FIG. 16, in this embodiment, the management table for available client objects permanently stores the corresponding relationship between the object names of available client objects and the MAC addresses of computers on which the available client objects can run. More specifically, when transmitting a client object to a client PC, the reference to the table of FIG. 16 makes it possible to transmit only the client object that can be used by the client PC.

The process procedures of the controllers of the object management server 1 and the PCs 3 and 4 of this embodiment are basically the same as those described with reference to the flow charts shown in FIGS. 3, 4, 7 and 8, except that at S405 and S805 where each object is transmitted, it is determined whether or not the requested object is an object that can be used in the client PC by searching the linked client management table and the available object management table.

As described above, by using the software installing apparatus of this embodiment, it is possible to manage which object is transmitted in accordance with the client PC. This prevents a client object that cannot be executed due to insufficient functions and performance of the client PC from being transmitted.

The method of using a MAC address and the method of using an IP address as a method for identifying a PC have been described. In the case where the MAC address is used, one PC has only one MAC address, so that the MAC address can be used in all cases. However, in the case of the IP address, since the IP address may be assigned dynamically by DHCP (Dynamic Host Configuration Protocol), the IP address can be used as the identifier only in the case where one IP address is permanently assigned to a terminal, or in the case where the PC is used within one segment of the network (i.e., an area where the PC can move without changing the IP address). However, the IP address is advantageous because it can be used as the identifier for computer connection as it is. Furthermore, since the network manages the MAC address corresponding to the IP address, even in the case where the IP address is assigned dynamically by the DHCP, it is possible to get the MAC address. Therefore, when determining whether or not the object management server 1 should download, it is possible to get the MAC address corresponding to the registered IP address from the network to perform the process.

In this embodiment, the user's authority is not a factor restricting the available objects. However, as described later, by storing a table showing the corresponding relationship between users and objects that the users are permitted to access, it is possible to restrict the available objects for each user.

Fifth Embodiment

Next, a fifth embodiment of the present invention will be described with reference to the accompanying drawings below.

The structure of the object management server 1 of this embodiment is the same as that shown in FIG. 13.

In this embodiment, however, a server object and a client object that are not previously registered in the object management server 1 are included, for example in the object storing device 32 of the PC 3. In other words, the software installing apparatus of this embodiment enables an object that is not registered in the object management server 1 to be used in an environment where the software installing apparatus of the present invention is realized.

Figure 17:
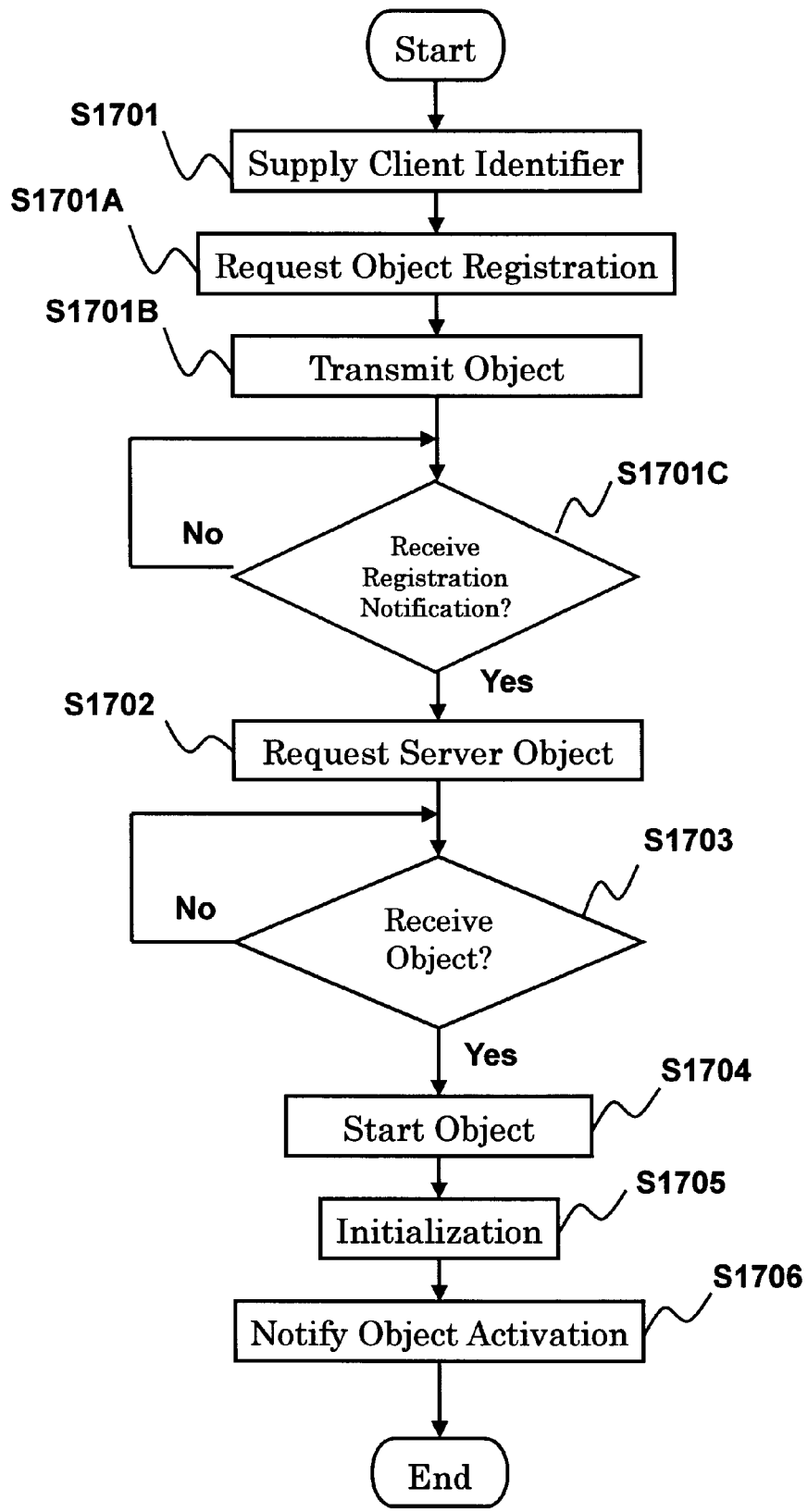
FIG. 17 is a flow chart showing the procedure of a controller 31 of the PC 3 when an object stored in an object storing device 32 of the PC 3 is registered in the object management server 1 in a fifth embodiment of the present invention.

FIG. 17 is a flow chart showing the process procedure of the controller 31 of the PC 3 when the object that is stored in the object storing device 32 in the PC 3 is registered in the object management server 1.

As shown in FIG. 17, the process procedure of the controller 31 in this case is substantially the same as that described with reference to the flow chart of FIG. 3 except the following procedure. After the identifier of the PC 3 is supplied (S1701), the communication processor 311 requests the object management server 1 to register an object (S1701A). Thereafter, the server object and the client object stored in the object storing device 32 in the PC 3 are transmitted (S1701B).

As described later, the object management server 1 that received the transmitted object performs a process of object registration and notifies the PC 3 of the end of the registration. Then, the PC 3 that received the notification (S1701C: Yes) performs processes (S1702 to S1706) similar to the processes described in FIG. 3.

Figure 18:
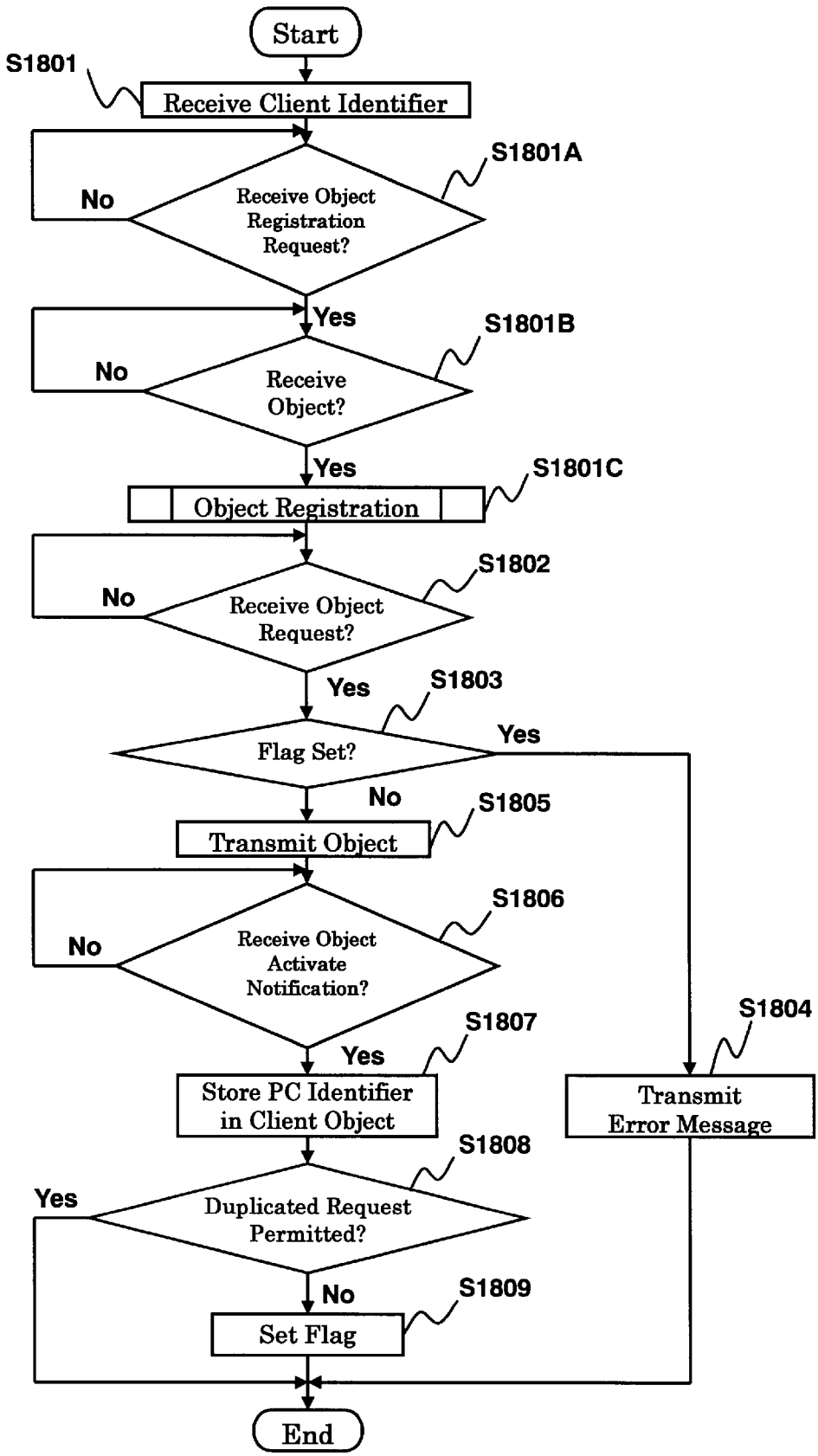
FIG. 18 is a flow chart showing the procedure of a controller 11 of the object management server 1 when an object is registered in the fifth embodiment of the present invention.

Next, the process procedure of the controller 11 of the object management server 1 when the object is registered will be described. FIG. 18 is a flow chart showing the process procedure of the controller 11 in this case.

As described in FIG. 18, the process procedure of the controller 11 in this case is substantially the same as that described with reference to the flow chart of FIG. 4 except the following procedure. After receiving the identifier of the PC 3 (S1801), the controller 11 receives a request to register an object from the PC 3 (S1801A: Yes). When the controller 11 further receives the object to be registered (S1801B: Yes), it registers the object (S1801C).

Figure 19:
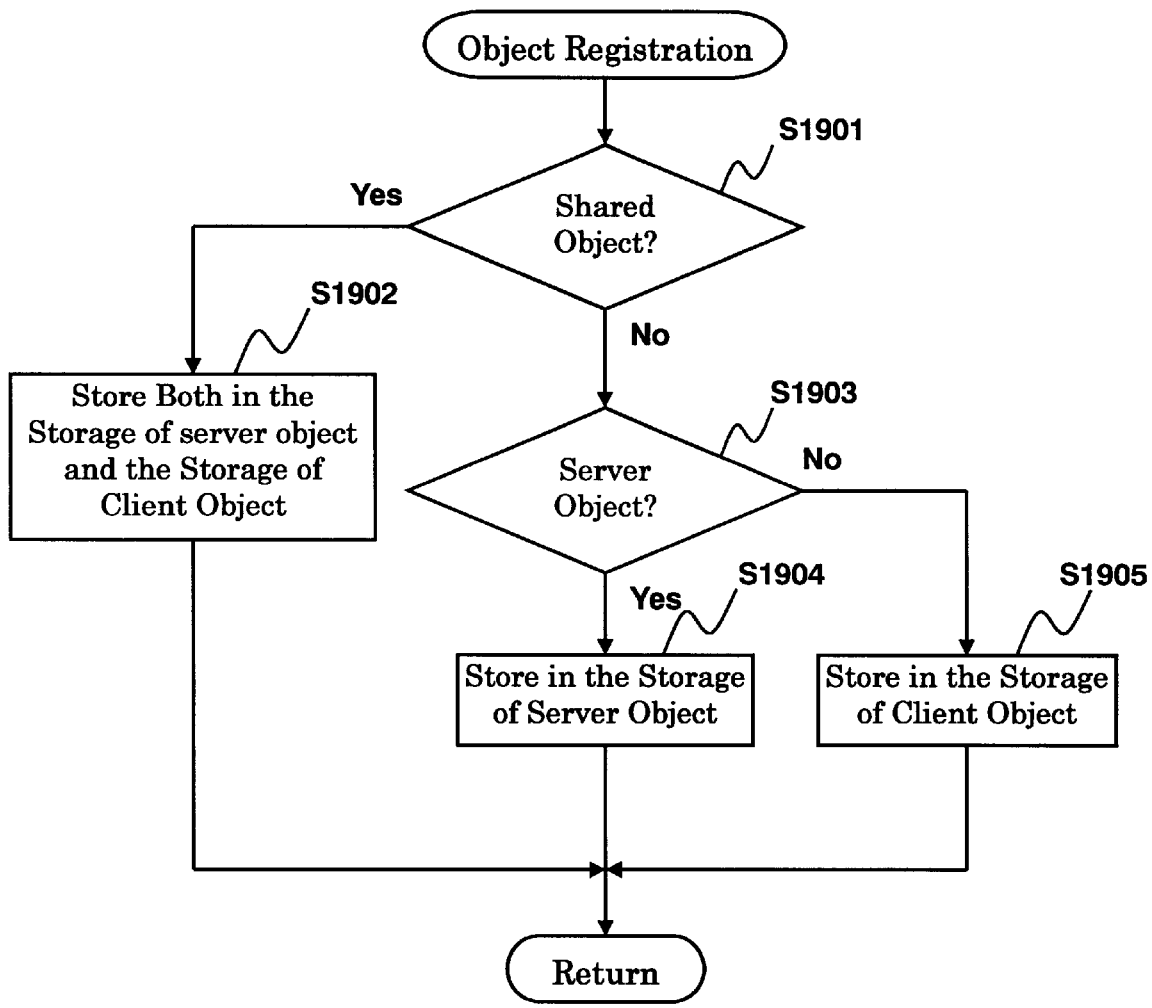
FIG. 19 is a flow chart showing the detailed procedure of an object registration process in the fifth embodiment of the present invention.

Herein, "process of object registration" refers to a process of storing a transmitted object in a storage device. FIG. 19 is a flow chart showing the process procedure of object registration in detail. As shown in FIG. 19, in the object registration process in this embodiment, first, it is determined whether or not a new object to be registered is shared as the server object and the client object (S1901). In the case where the server object and the client object are the same, an object is shared as the server object and the client object. In other words, the server object and the client object that provide the same service have much in common, and thus one object that has both functions as the server object and the client object operates as the server object and the client object in many cases. Therefore, in such a case (S1901: Yes), the transmitted object is stored both in the storage device of the server object 12 and the storage device of the client object 13 (S1902).

When the transmitted object is not a shared object (S1901: No), the controller 11 determines whether or not the transmitted object is a server object (S1903). More specifically, when a new object is transmitted from the PC, a different message is used depending on which object is registered, a server object or a client object. Therefore, the controller 11 determines which message is used so as to determine whether or not the transmitted object is a server object.

When the transmitted object is a server object (S1903: Yes), the controller 11 stores the transmitted object in the storage device of the server object 12 (S1904).

On the other hand, when the transmitted object is not a server object (S1903: No), the controller 11 determines that the transmitted object is a client object and stores the transmitted object in the storage device of the client object 13 (S1905).

At this time, the registration to the available object table is not performed, because storing the server object 12 in the storage device does not mean that the object is available. The data of the object is stored in the available object table when the server object 12 has been transmitted to the PC and started.

As described above, when the object registration process ends, referring back to the flow chart of FIG. 18, the controller 11 of the object management server 1 performs processes (S1802 to S1809) similar to those described in FIG. 4.

As described above, the use of the software installing apparatus of this embodiment enables an object that is not registered in the object management server 1 to be used easily, for example in the case where a software program that is installed in a note size PC is used cooperatively.

Sixth Embodiment

Next, a sixth embodiment of the present invention will be described with reference to the accompanying drawings below.

The structure of the object management server 1 in this embodiment is the same as that shown in FIG. 13.

In this embodiment, before a PC on which a server object can start is connected to the LAN 2, a PC on which a client object can start is connected to the LAN 2. In other words, the software installing apparatus of this embodiment makes it possible to perform an appropriate process, in the case where a PC for starting a client object is connected whereas a server object is not started.

Figure 20:
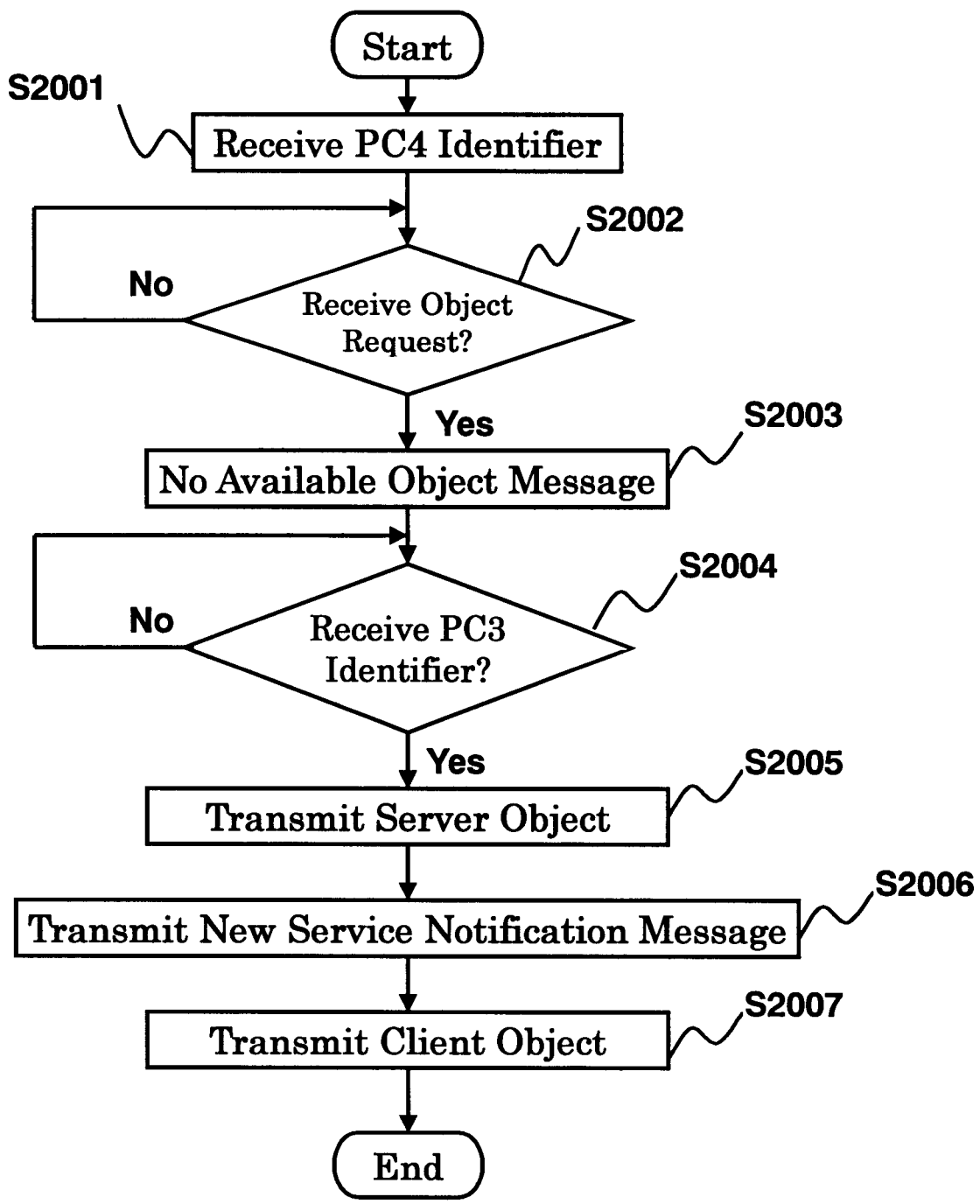
FIG. 20 is a flow chart showing the procedure of the controller 11 of the object management server 1 when the PC 3 on which a sever object runs is not connected and the PC 4 on which a client object runs is connected in a sixth embodiment of the present invention.

FIG. 20 is a flow chart showing the process procedure of the controller 11 of the object management server 1 in the case where the PC 4 for starting a client object is connected whereas the PC 3 for starting a server object is not connected.

As shown in FIG. 20, in this embodiment, the object management server 1 receives the identifier of the PC 4 on which a client object can start (S2001). Next, upon the reception of a request to transmit a client object from the PC 4 (S2002: Yes), the linked client managing part 115 registers the identifier of the PC 4 (IP address in this embodiment) in the linked client management table.

Furthermore, the available object managing part 116 refers to the available object management table only to find that no available client object is present yet at this point. That is, at this point, there is no PC on which a server object is started.

Therefore, the communication processor 111 transmits a message to the PC 3 that no object is available (S2003). As described later, when an available object is present, an object transmission message including the client object as a parameter is transmitted. In the case where there is no available object, a message not including the parameter is transmitted.

Next, when the PC 3 on which a server object can start is connected, the communication processor 111 receives the identifier of the PC 3 (S2004: Yes). In this embodiment, after the process of transmitting the server object to the PC 3 described with reference to the flow chart of FIG. 4 (S2005), the communication processor 111 transmits to the PC indicated in the linked client management table the client object corresponding to the server object that has been transmitted and has started its operation as a new service notification message (S2006).

In this embodiment, the new service notification message is transmitted to the previously connected PC 4. Thereafter, the controller 11 complies with a client object request from the PC 4, as described with reference to the flow chart of FIG. 7, and performs the client object transmission process (S2007), as described with reference to the flow chart of FIG. 8. Thus, a cooperative operation is possible between the PCs 3 and 4.

Figure 21:
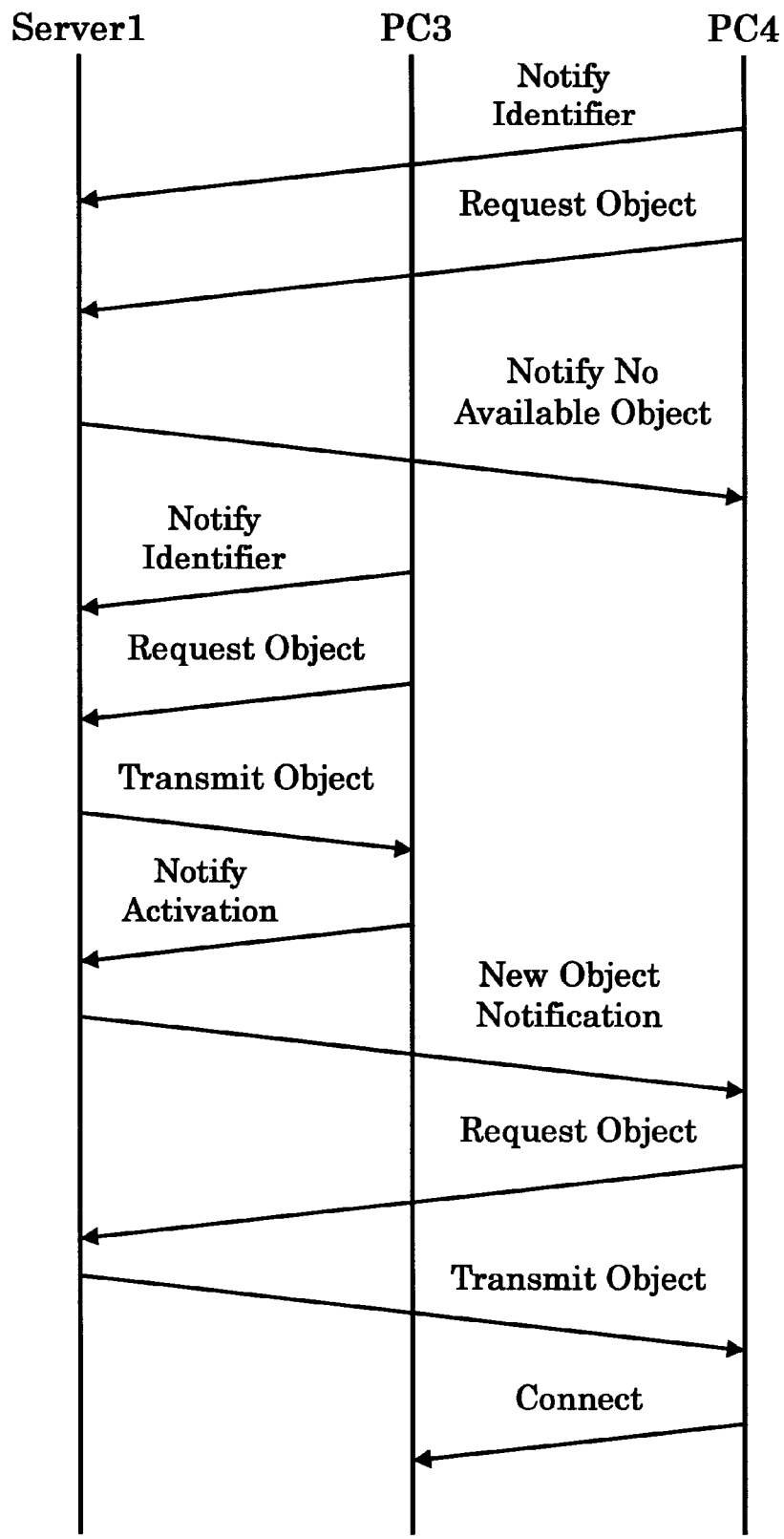
FIG. 21 is a timing chart showing a communication sequence from the request of the PC 4 for linking to the link of the PC 4 to the PC 3 in the sixth embodiment of the present invention.

FIG. 21 is a timing chart showing a communication sequence from the time when the PC 4 requests to be linked to the time when the PC 4 is linked to the PC 3. The state when the PC 4 is linked to the PC 3 is the same as that when the PC 3 is first connected and then the PC 4 is connected.

As described above, the use of the software installing apparatus of this embodiment makes it possible to utilize a cooperatively operable software regardless of the order of the connection of the computers.

Seventh Embodiment

Next, a seventh embodiment of the present invention will be described with reference to the accompanying drawings.

The structure of the object management server 1 is the same as that shown in FIG. 13.

In this embodiment, the process in the case where the server object 12 and the client object 13 operate cooperatively between the PCs 3 and 4 and then the server object 12 ends its operation will be described.

From the first embodiment to the sixth embodiment, when the use of a PC ends, a notification of the end of an object running on the PC is supplied only to the object management server 1. This suffices in the case where all PCs end at the same time.

The software installing apparatus of this embodiment makes it possible to perform an appropriate process in the case where the server object and the client object operate cooperatively and then only the server object ends its operation whereas the client object does not end its operation.

Figure 22:
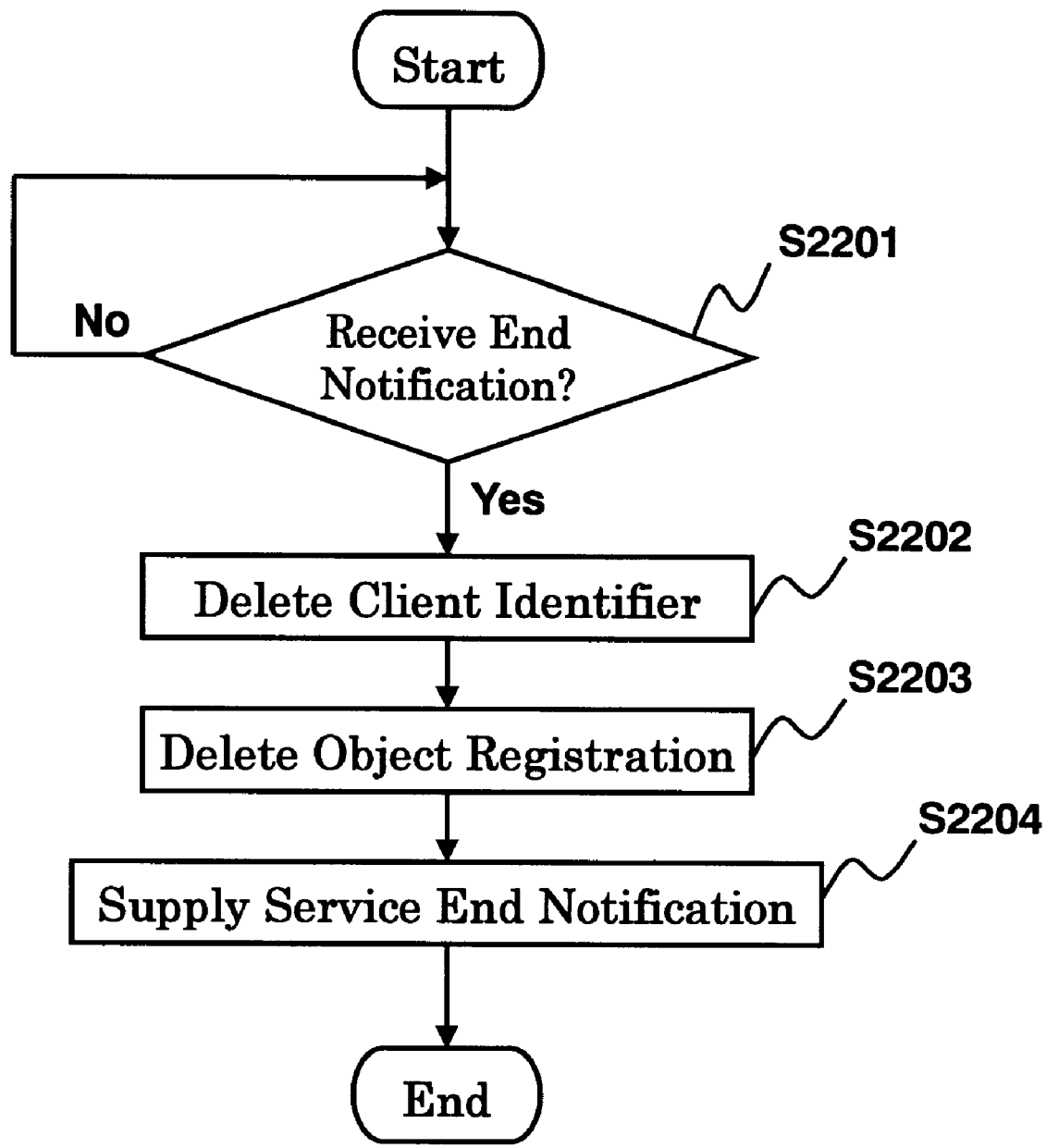
FIG. 22 is a flow chart showing the procedure of the controller 11 of the object management server 1 when a server object is terminated in a seventh embodiment of the present invention.

FIG. 22 is a flow chart showing the process procedure of the controller 11 of the object management server 1 when the server object ends its operation under the above-mentioned circumstances. As described above, the communication processor 111 receives a notification of the operation end of the server object 12 from the PC 3 (S2201: Yes), the linked client managing part 115 deletes the identifier of the PC 3 from the linked client management table (S2202), and the available object managing part 116 deletes the registration of the server object (S2203) and supplies a service end notification to the PC on which the corresponding client object is started (S2204).

In this embodiment, since the client object 13 runs on the PC 4, the communication processor 111 supplies a service end notification to the communication processor 411 of the PC 4.

In the PC 4, the communication processor 411 performs the process of ending the client object 13 upon the reception of the service end notification. More specifically, the transmitted object is deleted.

As described above, the use of the software installing apparatus of this embodiment enables only an available object to operate on the computers.

Eighth Embodiment

Next, an eighth embodiment will be described with reference to the accompanying drawings.

Figure 23:
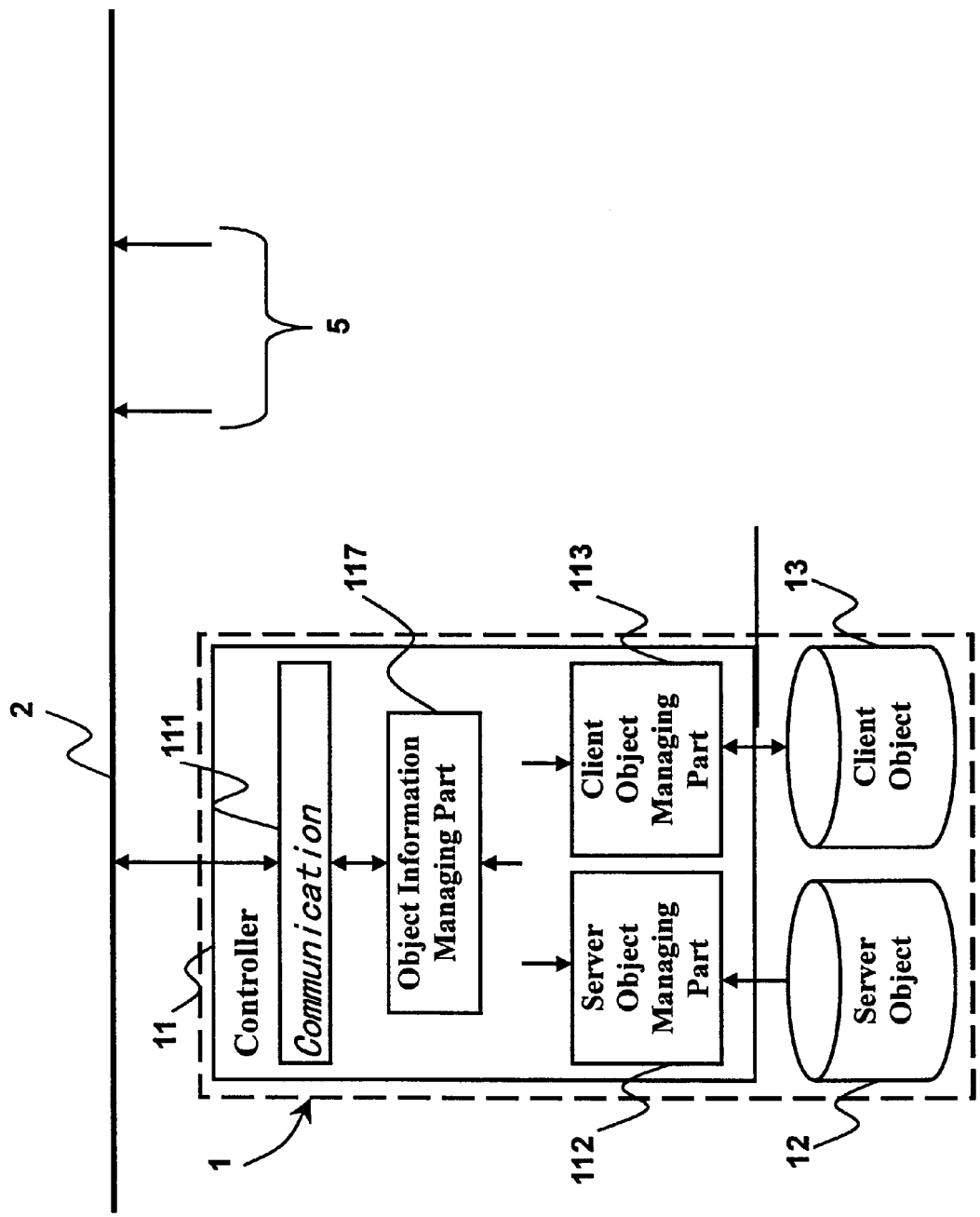
FIG. 23 is a functional block diagram showing the structure of the object management server 1 in an eighth embodiment of the present invention.

FIG. 23 is a functional block diagram showing the structure of the object management server 1 of this embodiment. As shown in FIG. 23, in this embodiment, the object management server 1 includes an object information managing part 117.

The object information managing part 117 receives the user identifier transmitted from a client PC and arranges that only objects that the user is permitted to access are transmitted to the PC. The determination whether or not the user is permitted to access an object is performed by referring to a table of objects that can be provided in the object information managing part 117. As the user identifier, for example, an identifier input by the user on a log-on screen can be used.

FIG. 24 is a diagram showing an exemplary table of objects that can be provided. As shown in FIG. 24, the object table in this embodiment stores the corresponding relationship between the client object name and the identifier of the user who is permitted to access the object. Therefore, the name of the client object that can be provided to the linked user can be searched with reference to the table by using the user identifier supplied from the client PC as the key.

The process procedures of the object management server 1 and the controller of the PCs 3 and 4 are basically the same as those in the flow charts of FIGS. 3, 4, 7 and 8. In this embodiment, however, at S405 and S805 where each object is transmitted, it is determined whether or not an requested object is permitted to be transmitted by searching the table of objects that can be provided by using the user identifier as the key.

As a result of the determination, the requested object is transmitted if the transmission thereof is permitted, whereas the object is not transmitted if the transmission is not permitted.

As described above, the use of the software installing apparatus of this embodiment ensures that only objects that the user is permitted to access are transmitted.

Ninth Embodiment

Next, a ninth embodiment will be described with reference to the accompanying drawings.

Figure 25:
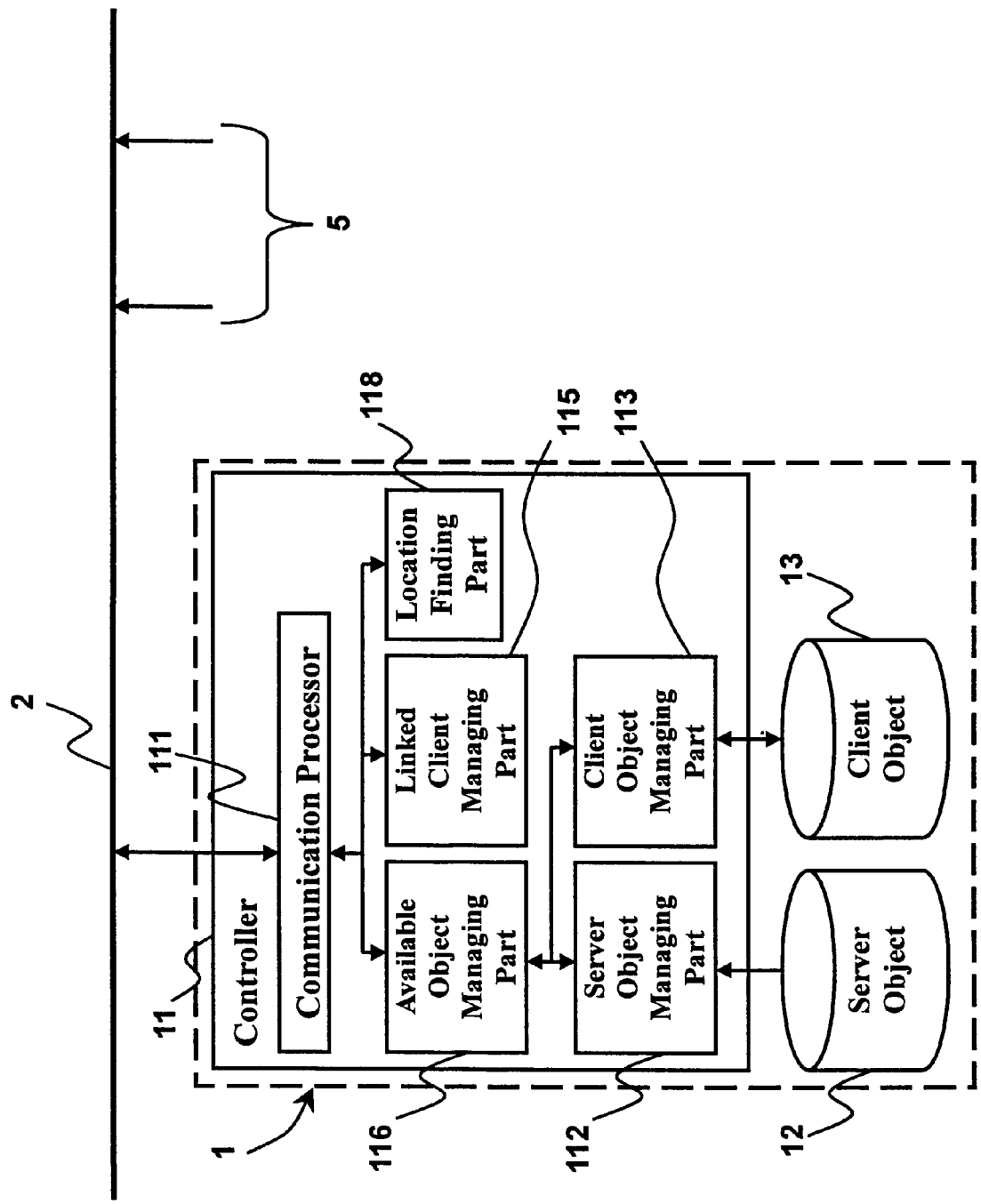
FIG. 25 a functional block diagram showing the structure of the object management server 1 in a ninth embodiment of the present invention.

FIG. 25 is a functional block diagram showing the structure of the object management server 1 of this embodiment. As shown in FIG. 25, in this embodiment, the object management server 1 includes a location identifying part 118, in addition to the elements shown in FIG. 13. Furthermore, in this embodiment, the LAN 2 is one of a plurality of LANs that are distributed over several floors or rooms, each of which is assigned a different network address. Therefore, the linked client managing part 115 in this embodiment manages clients for each location (LAN) and the available object managing part 116 manages available objects for each location (LAN).

FIGS. 26 and 27 are diagrams showing exemplary available object management tables in this embodiment. FIG. 26 is an exemplary available server object management table, and FIG. 27 is an exemplary available client object management table. In the examples shown in FIGS. 26 and 27, two locations, "Room A" and "Room B", are registered. Room A and Room B are separate meeting rooms, where LANs with different network addresses are provided. Three objects are available in Room A and two objects are available in Room B. Room A has a PC with a large display, which can be operated by a PC of a user via the network. The object that can realize this operation is Object A. In Room B, which does not have such a facility, there is no need of starting Object A.

In the examples shown in FIGS. 26 and 27, Object B is an object for distributing files such as word processed documents as references to all participants in the meeting. Object C is an object for controlling a printer provided in the meeting room. In other words, these objects are prepared as objects common to all the meeting rooms.

When the location identifying part 118 receives an object transmission request from a client PC, it gets the IP address of the PC with reference to the information managed by the linked client managing part 115 so as to identify the LAN to which the PC is connected. Methods for identifying the network address of the LAN differ depending on the type of the IP address, but they are well-known, so that they are not further described here.

Thereafter, the available object managing part 116 transmits only the object available to the LAN identified by the location identifying part 118 with reference to the available object managing tables shown in FIGS. 26 and 27.

Figure 28:
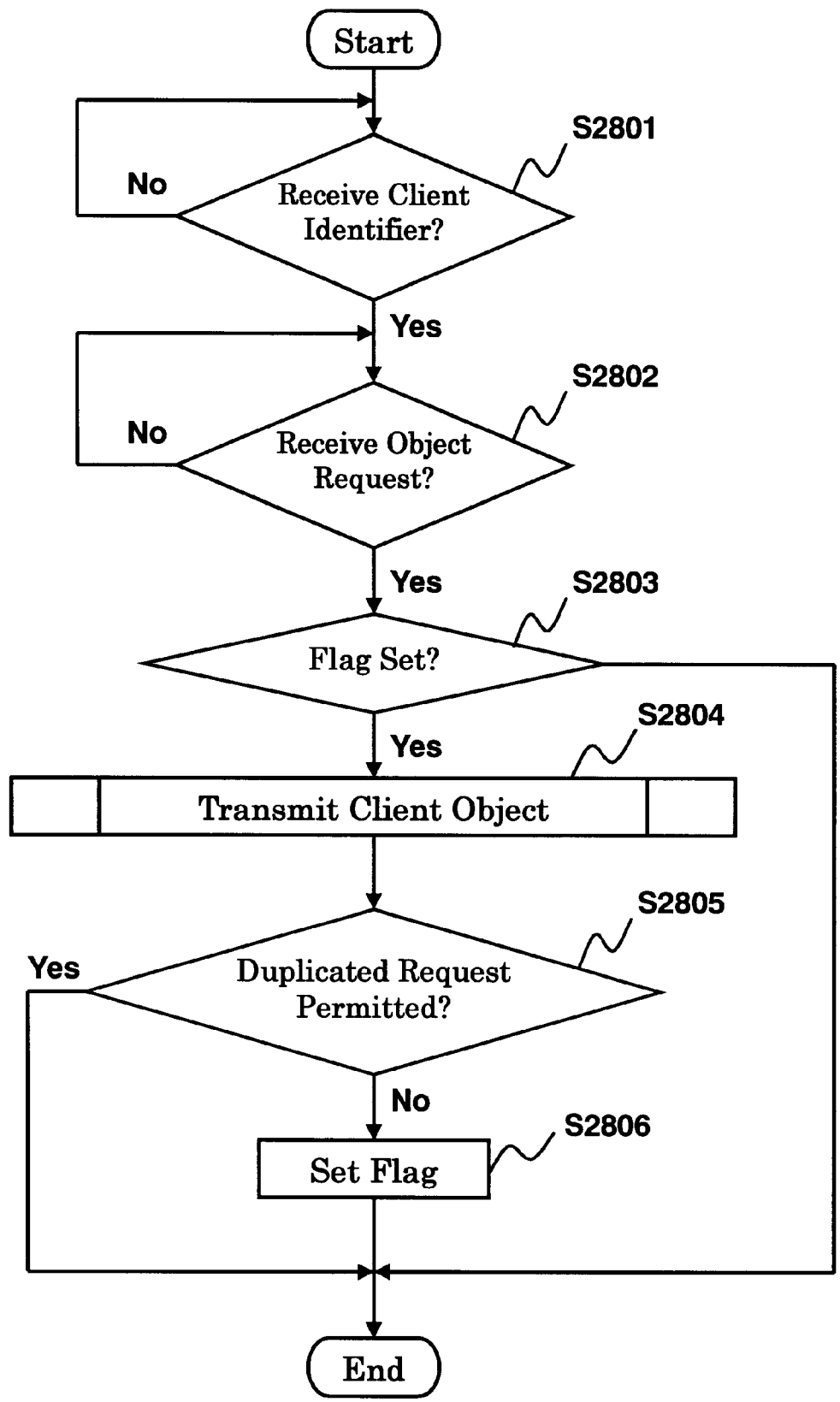
FIG. 28 is a flow chart showing the procedure of the communication processor 111 of the object management server 1 when the PC 4 is connected to the LAN 2 in the ninth embodiment of the present invention.

FIG. 28 is a flow chart showing the process procedure of the controller 11 of the object management server 11 in the case where the PC 4 on which the client object runs is connected. As shown in FIG. 28, the process procedure of the controller 11 in this embodiment is basically the same as that described with reference to the flow chart of FIG. 8, except that in a client object transmission process (S2804), the above-described process is performed.

Figure 29:
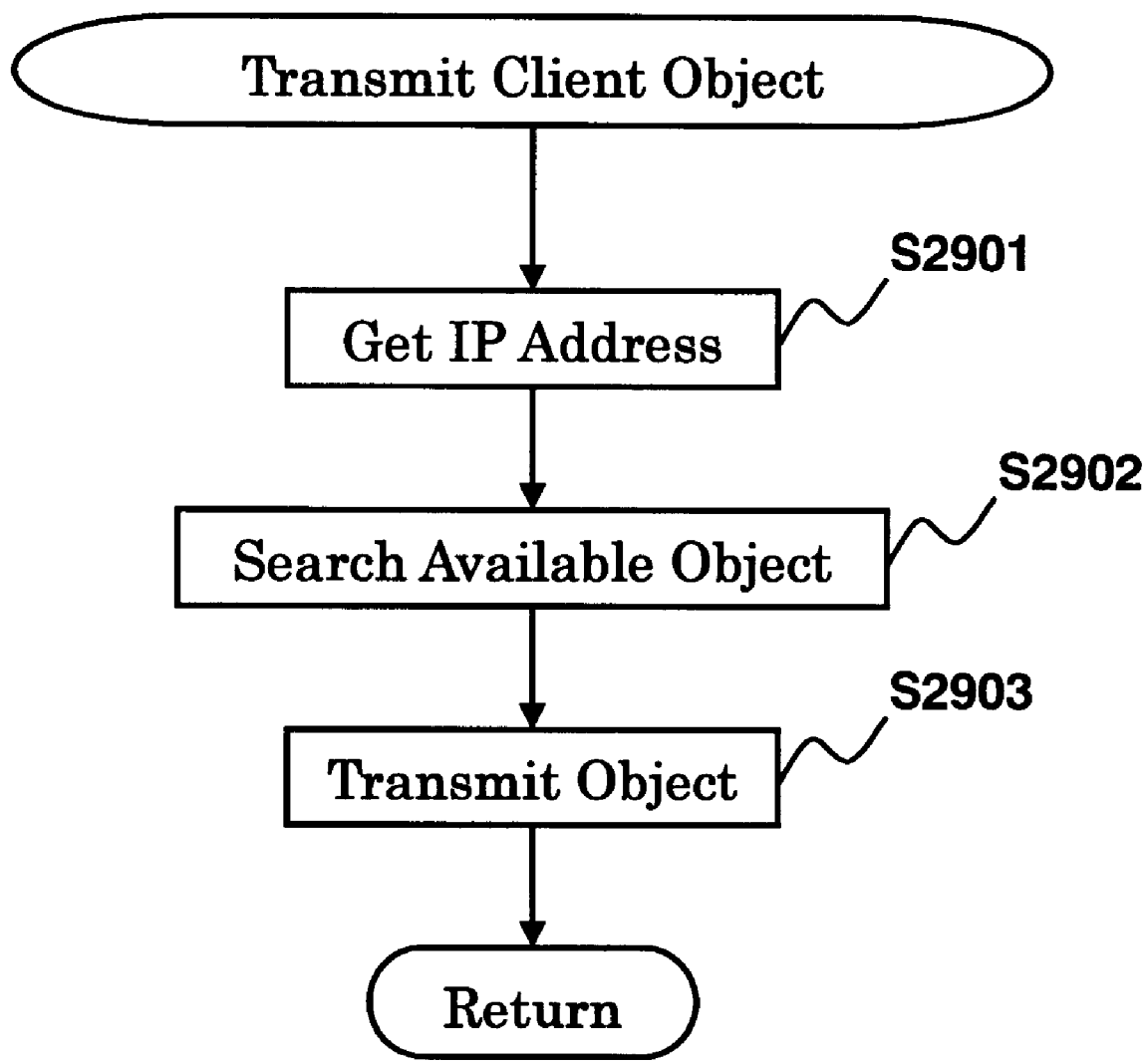
FIG. 29 is a flow chart showing the detailed procedure of a client object transmission process in the ninth embodiment of the present invention.

FIG. 29 is a flow chart showing the detailed procedure of the client object transmission process. As shown in FIG. 29, in this embodiment, the location identifying part 118 first acquires the IP address of the connected PC (S2901) and searches available object names (S2902) with reference to the available client object management table shown in FIG. 27.

Furthermore, the searched client object is transmitted (S2903), and referring back to the flow chart of FIG. 28, the subsequent processes are performed.

As described above, the use of the software installing apparatus of this embodiment can provide a service of a cooperatively operable software to users linked in the same location (LAN). The present invention is effective, for example in an environment where each of a plurality of LANs has a different available object and one object management server 1 has to manage all objects.

Tenth Embodiment

Next, a tenth embodiment of the present invention will be described with reference to the accompanying drawings.

Figure 30:
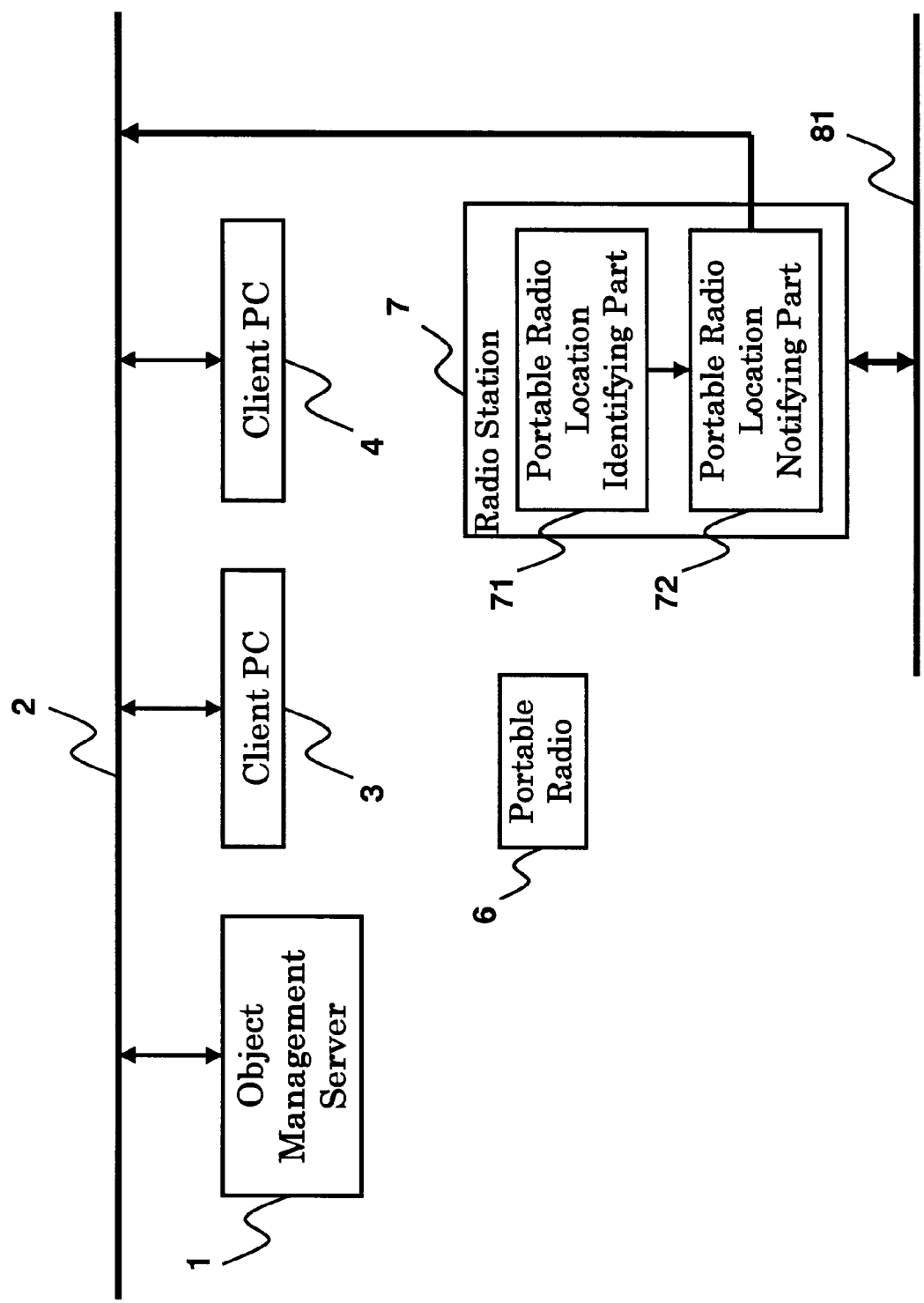
FIG. 30 is a diagram showing an environment where a software installing apparatus is realized in a tenth embodiment of the present invention.

FIG. 30 shows an environment where the software installing apparatus of this embodiment is realized. As shown in FIG. 30, in the environment where the software installing apparatus of this embodiment is realized, a portable radio 6 and a radio station 7 are used. Reference numeral 81 denotes a network connecting radio stations. Furthermore, the radio station 7 includes a portable radio location identifying part 71 and a portable radio location notifying part 72. The structure of the object management server of this embodiment is the same as that described with reference to FIG. 25. The structures of the client PCs 3 and 4 are the same as above, so that they are not further described here.

In order to communicate with other portable radio users, the portable radio 6 has to be registered at a nearby radio station. For example, if the portable radio 6 is close to the radio station 7, the communication to the portable radio 6 from other portable radios is performed through the network 81 and the radio station 7. In this embodiment, the portable radio 6 is carried by the user of the PC 4.

When the portable radio 6 communicates with the portable radio location identifying part 71 in the radio station 7, the portable radio location identifying part 71 transmits the identifier of the portable radio 6 to the portable radio location notifying part 72. Then, the portable radio location notifying part 72 transmits the identifier of the portable radio 6 to the communication processor 111 of the object management server 1.

The location identifying part 118 in this embodiment previously has stored the corresponding relationship between the identifier of the portable radio 6 and the user identifier and between the user and the computer that the user carries. FIG. 31 is a diagram showing an exemplary table storing the corresponding relationship. As shown in FIG. 31, the location identifying part 118 in this embodiment stores telephone numbers of portable phones as the identifiers of the portable radios, the identifiers of users corresponding to the portable phones and the identifiers of the computers of the users.

The communication processor 111 that received the identifier of the portable radio 6 acquires the user identifier corresponding to the identifier of the portable radio 6 from the location identifying part 118 so as to register the corresponding relationship between the user identifier and the identifier of the connected location, more specifically, the radio station 7. FIG. 32 is a diagram showing an exemplary table storing the corresponding relationship between the user identifier and the identifier of the radio station 7.

Furthermore, the available object managing part 116 manages the available objects for each radio station identifier. FIGS. 33 and 34 are diagrams showing exemplary available object management tables. FIG. 33 is an exemplary available server object management table, and FIG. 34 is an exemplary available client object management table.

The process procedure of the controller 11 of this embodiment that stores the above-described tables will be detailed below. In this embodiment, the process procedure of the controller 11 of the object management server 1 in the case where the PC 4 on which a client object runs is connected is basically the same as that described with reference to the flow chart of FIG. 28, except that in the client object transmission process (S2804), the following process is performed.

Figure 35:
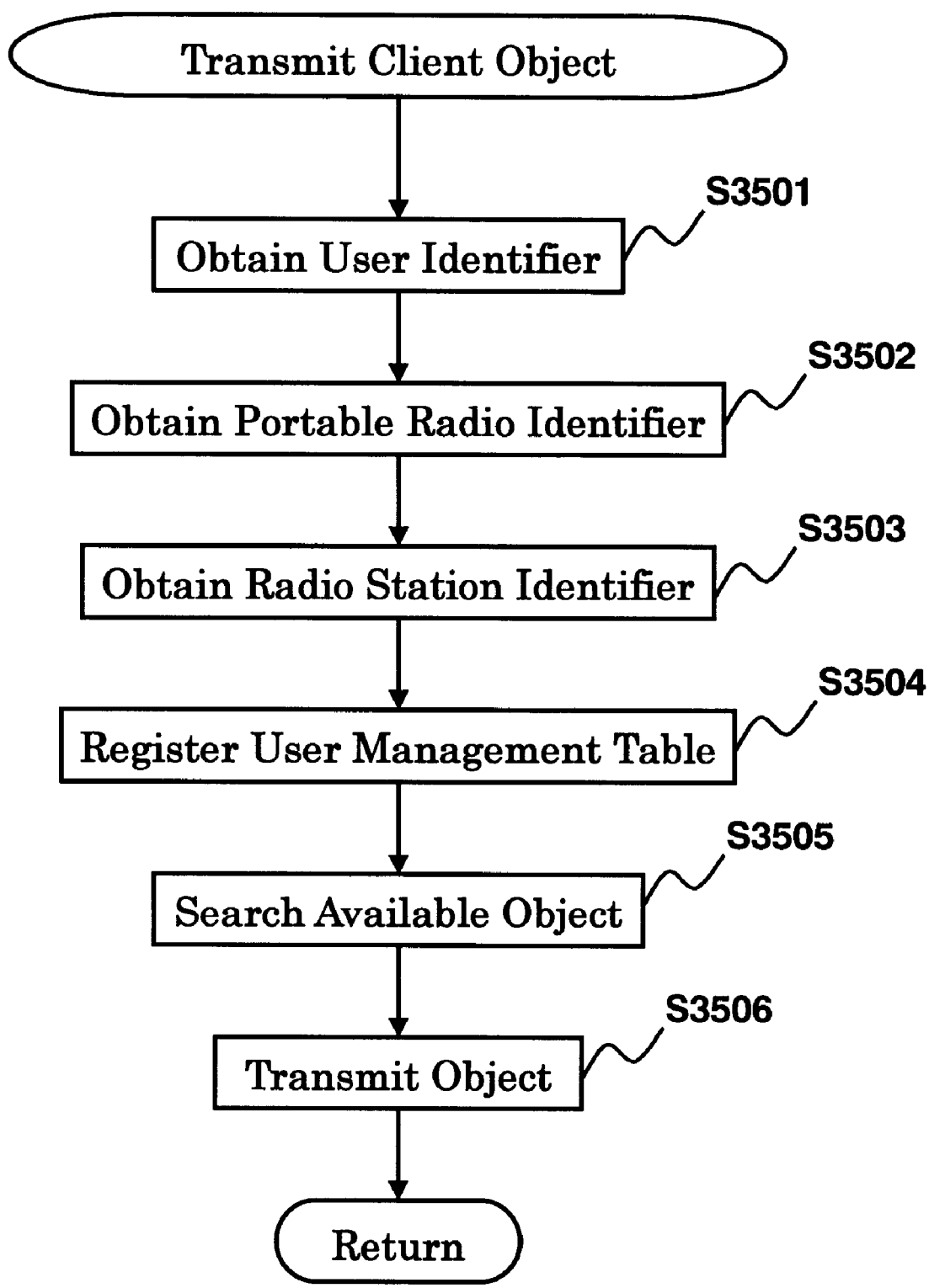
FIG. 35 is a flow chart showing the detailed procedure of a client object transmission process in the tenth embodiment of the present invention.

FIG. 35 is a flow chart showing the detailed process procedure of the client object transmission process in this embodiment. As shown in FIG. 35, in this embodiment, the location identifying part 118 obtains the identifier of the user who carries the PC 4 from the information stored as described above (S3501). Then, the identifier of the portable radio 6 is obtained from the user identifier (S3502). Furthermore, information on the location of the user, i.e., the identifier of the radio station 7 to which the portable radio 6 carried by the user is registered, is obtained from the identifier of the portable radio 6 (S3503).

When the information on the location of the user is obtained, the linked client managing part 115 registers the corresponding relationship between the user and the location where the user is (S3504). The available object managing part 116 searches the objects available in the user's location is with reference to the available object management table as described above (S3505).

Furthermore, the searched client object is transmitted (S3506), and referring back to the flow chart of FIG. 28, the subsequent processes are performed.

As described above, the use of the software installing apparatus of this embodiment makes it possible to transmit an object that can be used in the user's location.

Eleventh Embodiment

Next, an eleventh embodiment of the present invention will be described with reference to the accompanying drawings below.

Figure 36:
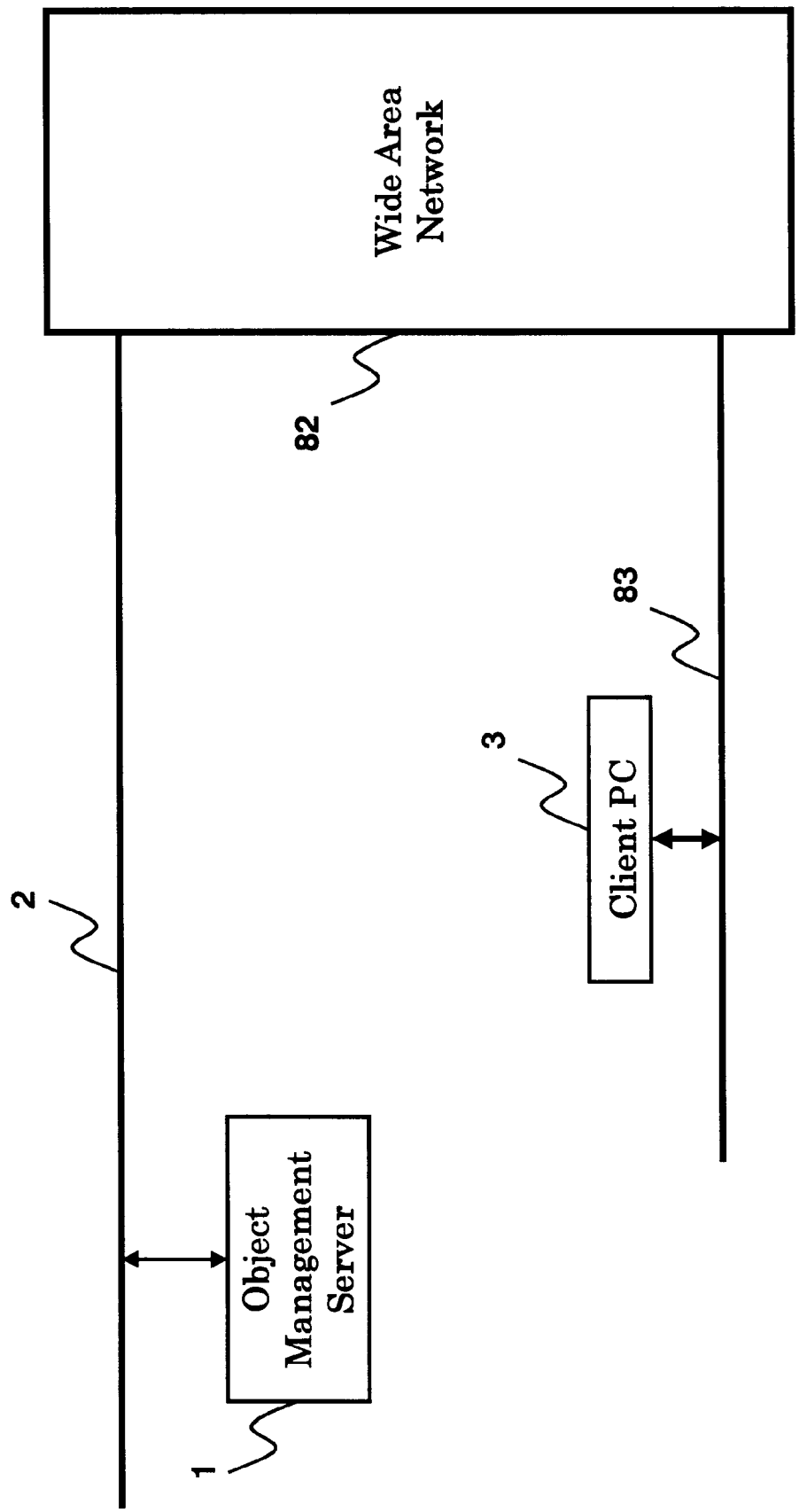
FIG. 36 is a diagram showing an environment where a software installing apparatus is realized in an eleventh embodiment of the present invention.

FIG. 36 is a diagram showing an environment where the software installing apparatus of this embodiment is realized. In FIG. 36, reference numeral 82 denotes a wide area network, and reference numeral 83 denotes a communication line. Furthermore, the object management server 1 of this embodiment is the same as that shown in FIG. 25.

In this embodiment, when the communication processor 311 of the PC 3 requests the communication processor 111 of the object management server 1 to link the PC 3 thereto, the communication processor 311 supplies information indicating the connected network address or location as additional information. More specifically, in the case where a user requests the link via a telephone line with a remote modem, the user makes his request with additional information indicating his location, for example his telephone number.

The object management server 1 that has received such information performs the same process as for the PC connected to the LAN 2 as described above, so as to transmit the requested object to the remote PC.

As described above, the use of the software installing apparatus of this embodiment makes it possible to easily use a cooperatively operable software in a predetermined location, even if the user is in a remote place.

Twelfth Embodiment

Next, a twelfth embodiment will be described with reference to the accompanying drawings below.

Figure 37:
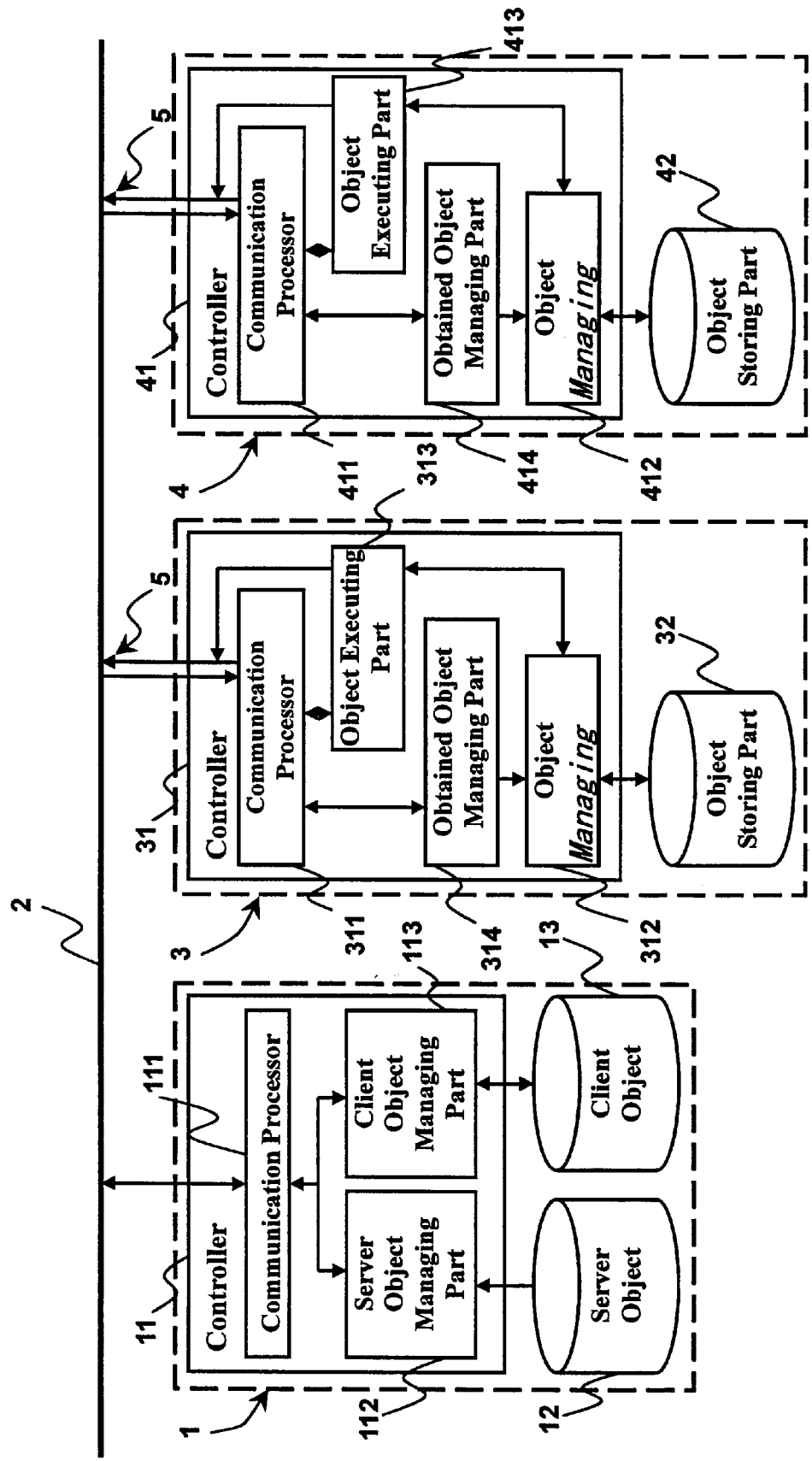
FIG. 37 is a functional block diagram showing the structure of a software installing apparatus in a twelfth embodiment of the present invention.

FIG. 37 is a functional block diagram showing the structure of the software installing apparatus of this embodiment. As shown in FIG. 37, in this embodiment, the PCs 3 and 4 include obtained object managing parts 314 and 414, respectively, in addition to the elements shown in FIG. 6.

In the previous embodiments, the object obtained by the client PC from the object management server 1 is deleted at the end of the operation. However, in this embodiment, the obtained object managing parts 314 and 414 manage the object that remains stored in the object storing devices 32 and 42 without being deleted among the objects obtained so far. More specifically, by storing a list of objects stored in the object storing devices 32 and 42, it is not necessary for the object management server 1 to transmit the objects again on request.

Figure 38:
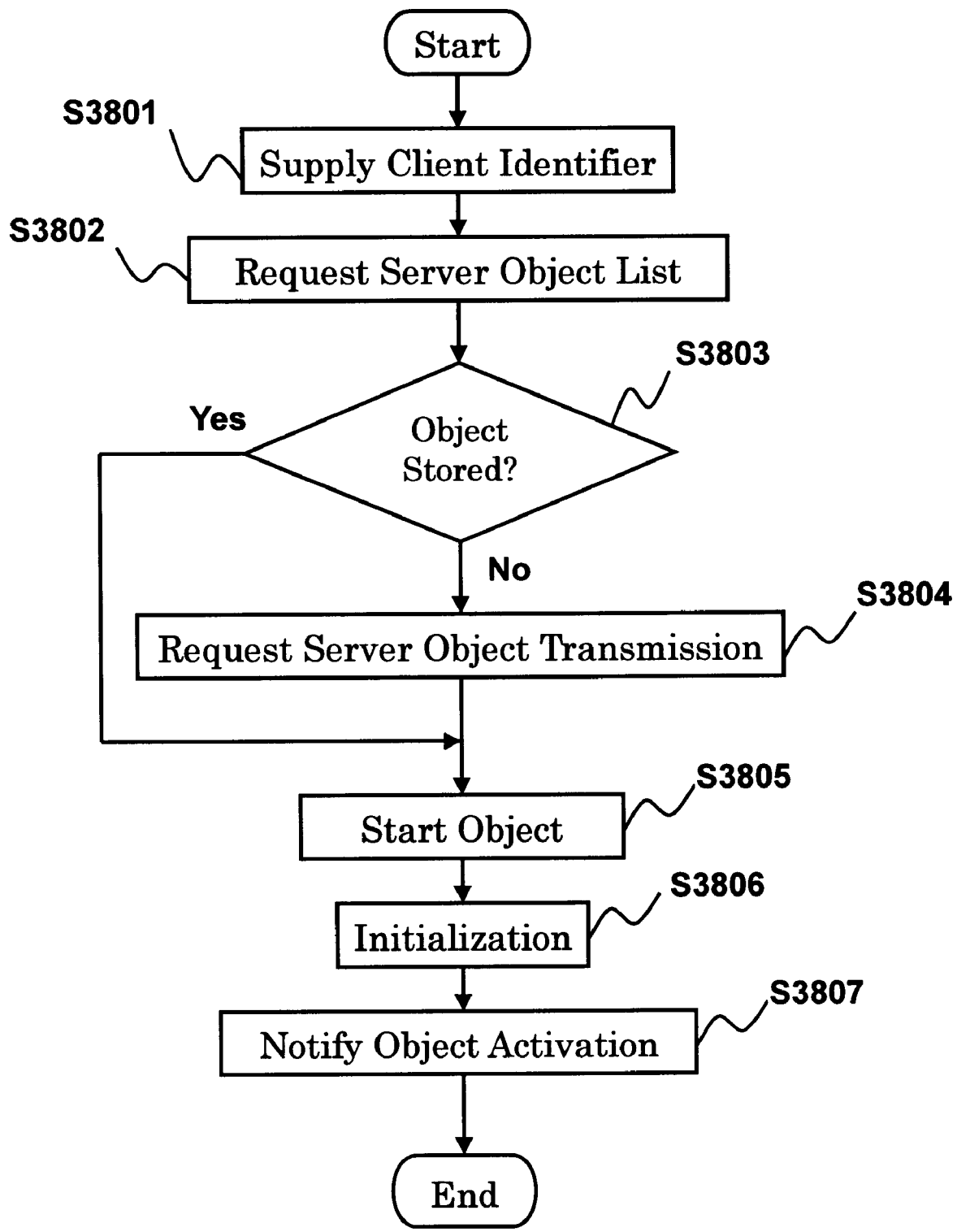
FIG. 38 is a flow chart showing the procedure of the controller 31 of the PC 3 when the PC 3 requests the object management server 1 to transmit an object in the twelfth embodiment of the present invention.

FIG. 38 is a flow chart showing the process procedure of the controller 31 of the PC 3 when the PC 3 requests the object management server 1 to transmit an object.

As shown in FIG. 38, in this embodiment, after first supplying the identifier of the PC 3 (S3801), the controller 31 requests the object management server 1 to transmit a list of server objects (S3802).

In this embodiment, a list of server objects is a list of available server objects or server objects that are allowed to be supplied to. The controller 31 that received the list of server objects lets the obtained object managing part 314 determine whether or not the server objects on the list are stored (S3803). When the server objects are stored in the object storing device 32 (S3803: Yes), it is not necessary for the object management server 1 to transmit the server objects again, and the server object is started by using a file stored in the object storing device 32 (S3805). Thereafter, an initialization process is performed (S3806), and an object start notification is supplied to the object management server 1 (S3807) in the same manner as described above.

On the other hand, the server objects on the list are not stored in the object storing device 32 (S3803: No), the controller 31 requests the object management server 1 to transmit the server objects again (S3804).

After the server object is transmitted in response to the request, the process proceeds to S3805, and the same processes as described above are performed.

Figure 39:
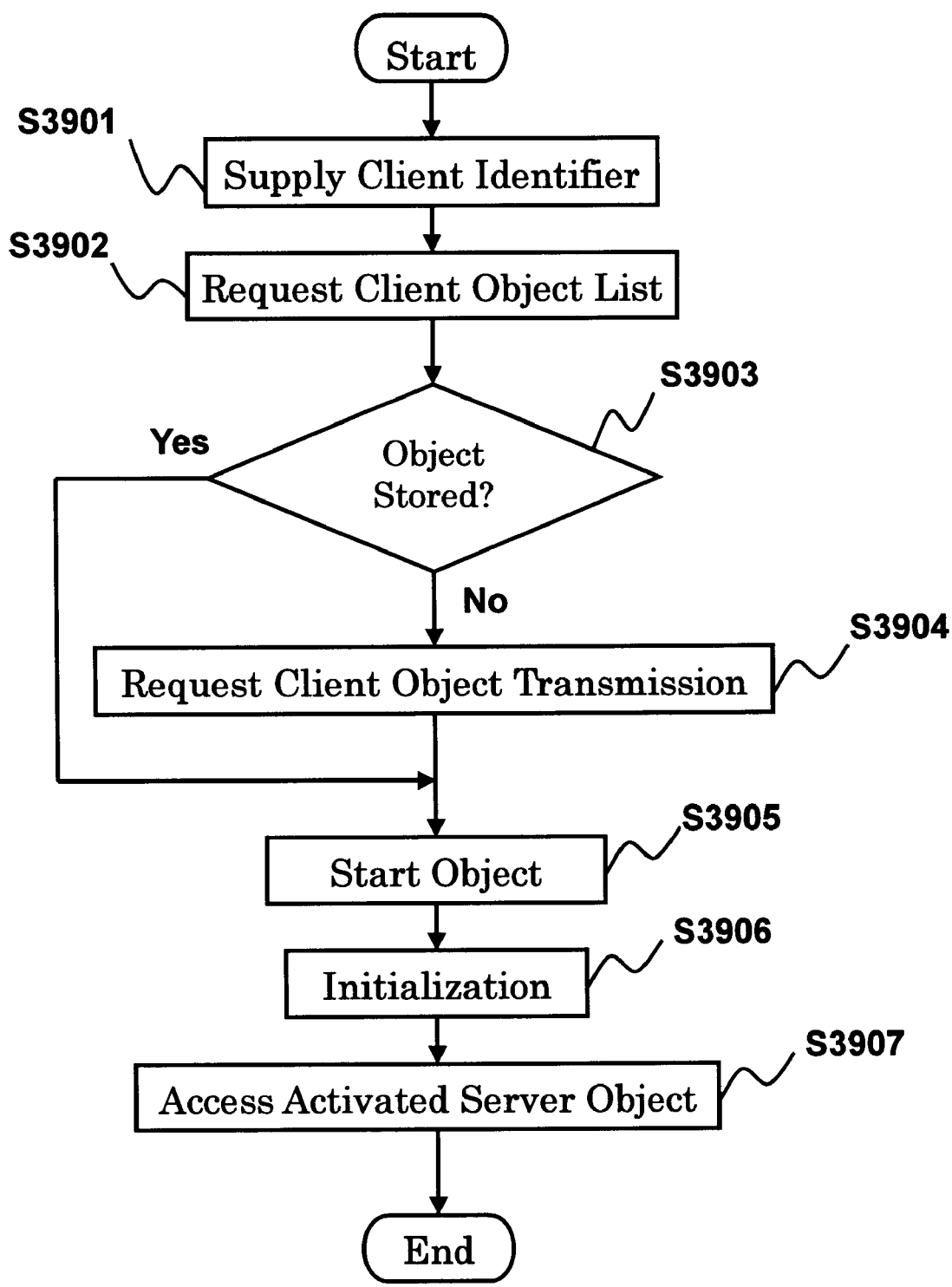
FIG. 39 is a flow chart showing the procedure of a controller 41 of the PC 4 when the PC 4 is linked in the twelfth embodiment of the present invention.

The above-described processes can be performed also in the case where the PC 4 is connected. FIG. 39 is a flow chart showing the process procedure of the controller 41 of the PC 4 in this case. At S3902, a list of client objects is requested. The list of client objects in this embodiment includes a list of available client objects or client objects that can be supplied to and the corresponding relationship between the client objects and the identifiers of client PCs on which the corresponding sever objects are started.

Figure 40:
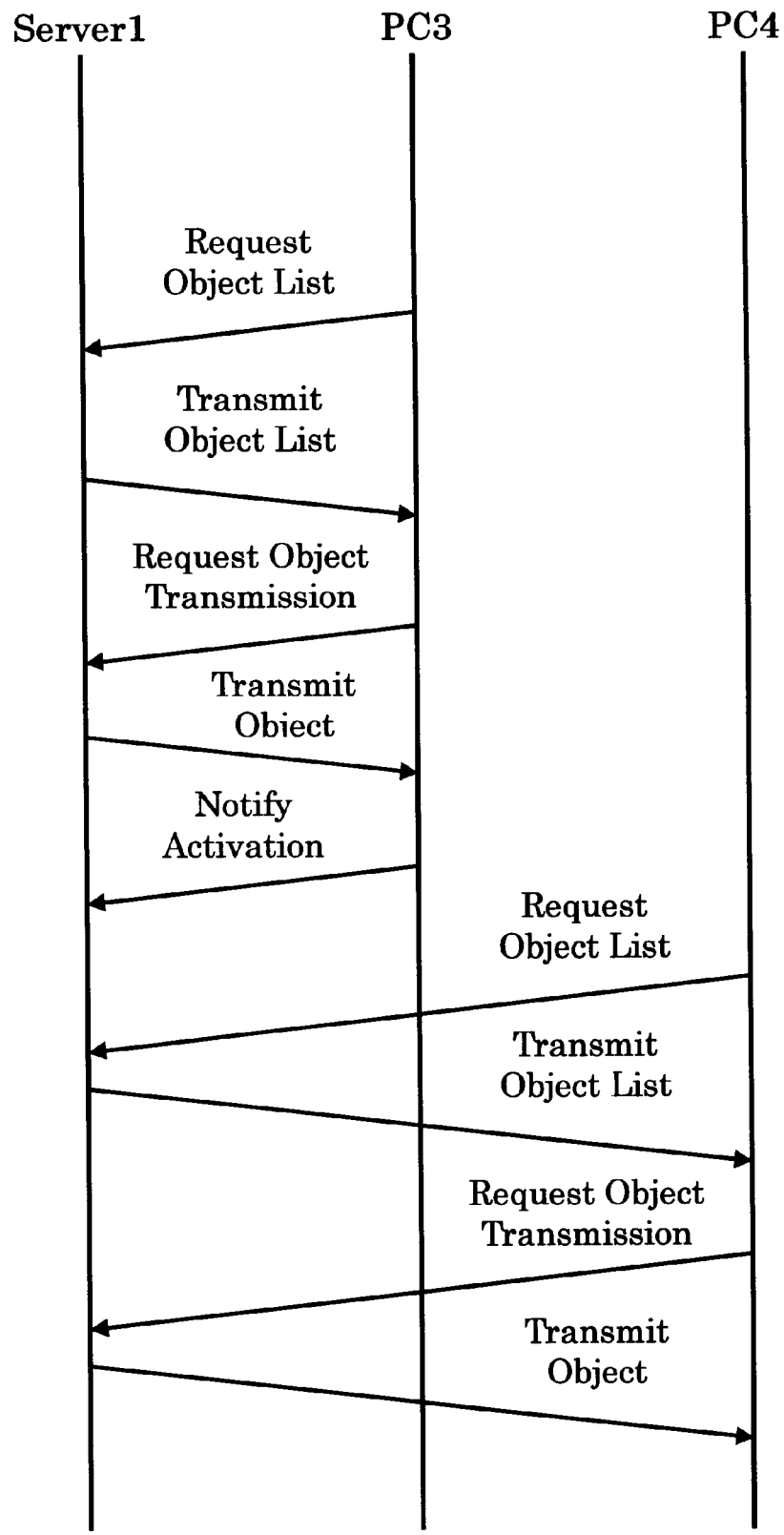
FIG. 40 is a timing chart showing a communication sequence from the request of the PC 3 for an object list to the transmission of an object to the PC 4 in the twelfth embodiment of the present invention.

The subsequent processes are similar to those in the case of the PC 3. Only in the case where the file of the client object is not stored in the object storing device 42 (S3903: No), the transmission of the client object is requested (S3904). Other processes are similar to those described above so that they are not further described here. FIG. 40 is a timing chart showing a communication sequence from the time when the PC 3 requests a list of objects to the time when the object is transmitted to the PC 4. In the example of FIG. 40, neither of the object storing devices of the PCs 3 and 4 stores the respective objects of interest. In the case where the object of interest is stored in the object storing device, the object transmission request process and the object transmission process are omitted.

As described above, the use of the software installing apparatus of this embodiment makes it possible to omit the transmission process in the case where it is not necessary to transmit the object. Thus, the workload on the network is reduced.

In this embodiment, a variety of information necessary for cooperative tasks can be added to the list of server objects or the list of client objects.

Thirteenth Embodiment

Next, a thirteenth embodiment of the present invention will be described with reference to the accompanying drawings below.

Figure 41:
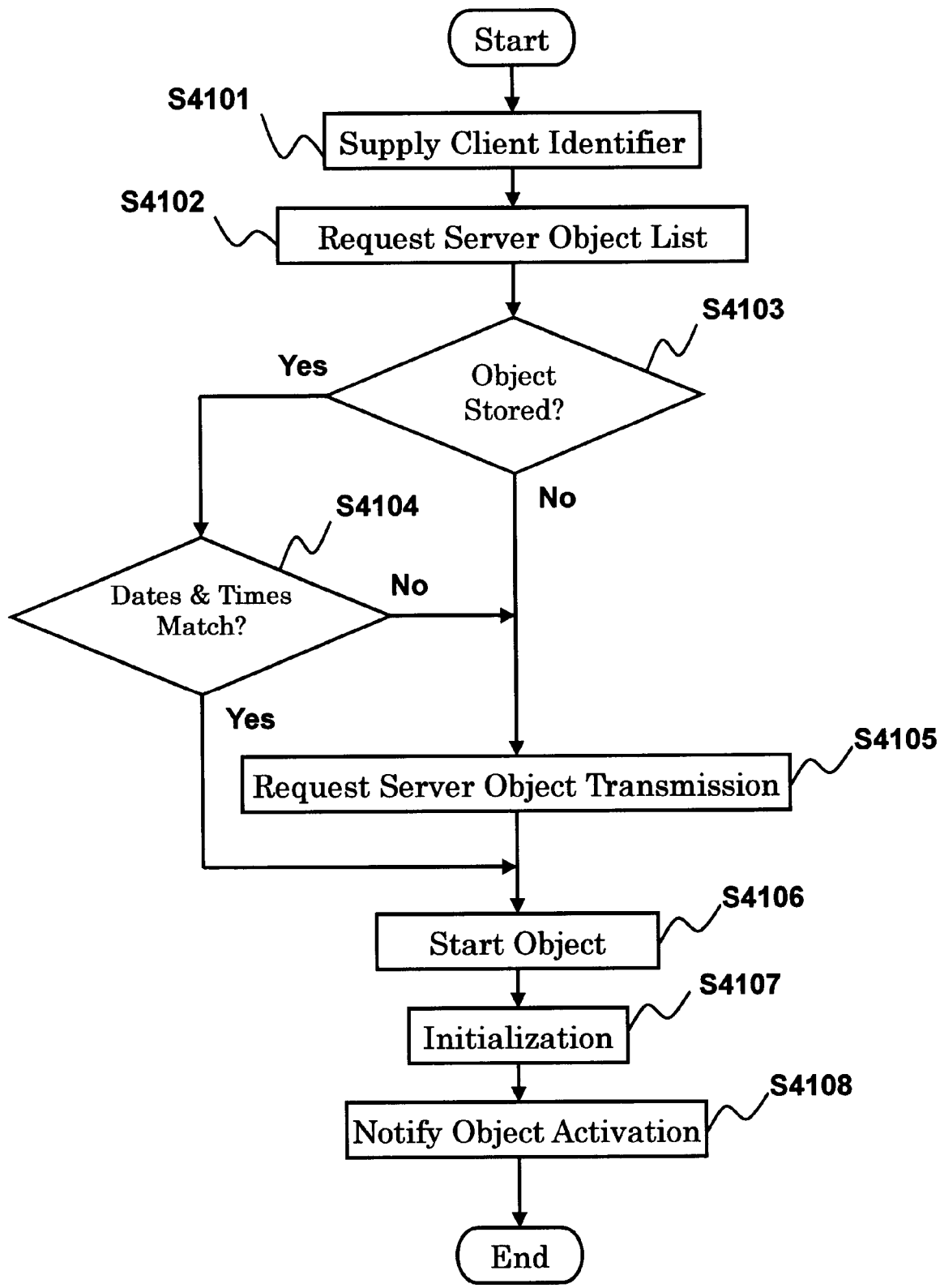
FIG. 41 is a flow chart showing the procedure of the controller 31 of the PC 3 when the PC 3 requests the object management server 1 to transmit an object in a thirteenth embodiment of the present invention.

The structure of the software installing apparatus of this embodiment is the same as that of the twelfth embodiment, except for the process procedures of the obtained object managing parts 314 and 414. FIG. 41 is a flow chart showing the process procedure of the controller 31 of the PC 3 when the PC 3 requests the object management server 1 to transmit an object in this embodiment.

As shown in FIG. 41, after first supplying the identifier of the PC 3 (S4101), the controller 31 requests the object management server 1 to transmit a list of server objects (S4102). These processes are the same as in the eleventh embodiment.

In this embodiment, when transmitting the list of server objects to the PC 3, the object management server 1 also transmits the creation date and time of each server object file as additional information.

The PC 3 that received the list of server objects determines whether or not the server object of interest on the list is stored in the object storing device 32 (S4103). When the sever object is stored in the object storing device 32 (S4103: Yes), the creation date and time of the file on the list is compared with that of the file stored in the object storing device 32 (S4104).

If the creation dates and times of both files match (S4104: Yes), it is not necessary to transmit the server object again, and the server object is started with the file already stored in the object storing device 32 (S4106). Thereafter, an initialization process is performed (S4107), and an object start notification is supplied to the object management server 1 (S4108) in the same manner as described above.

On the other hand, if the server object on the list is not stored in the object storing device 32 (S4103: No), or if the object is stored (S4103: Yes), but the creation dates and times do not match (S4104: No), the controller 31 requests the object management server 1 to transmit the server object (S4105). Thereafter, the procedure goes to S4106 and the same procedure is performed.

The case where the creation dates and times of both files do not match is, for example, the case where the PC cannot cope with the upgrade of the version of the software.

Figure 42:
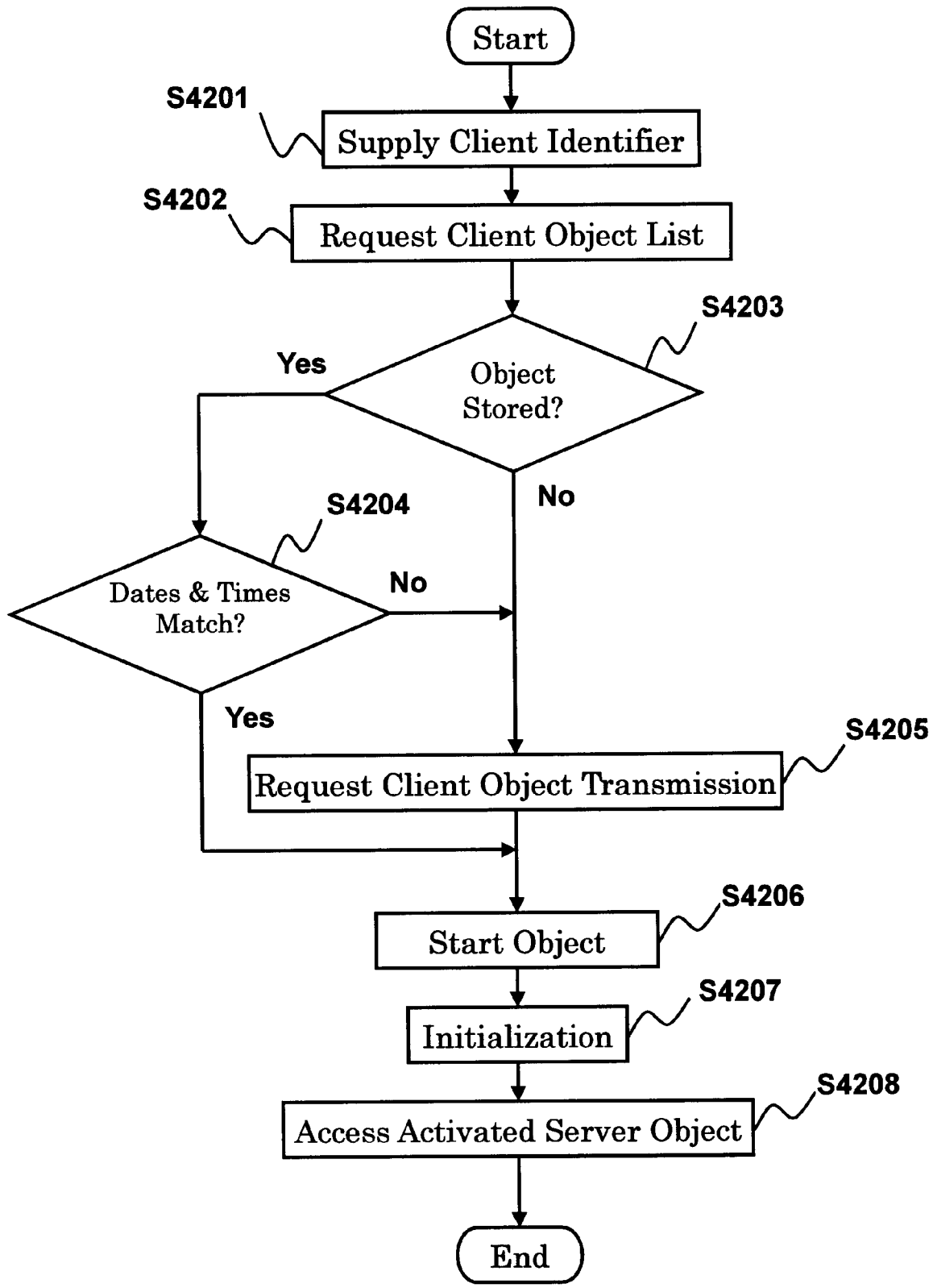
FIG. 42 is a flow chart showing the procedure of the controller 41 of the PC 4 when the PC 4 is linked in the thirteenth embodiment of the present invention.

The above-described procedure can be performed also in the case where the PC 4 is connected. FIG. 42 is a flow chart showing the process procedure of the controller 41 of the PC 4 in this case. As shown in FIG. 42, in the case of the PC 4 as well as the PC 3, only if the file of the client object of interest is not stored in the object storing device 42 (S4203: No), or if the creation dates and times of both files do not match although the file is stored (S4204: No), the controller 41 requests the object management server 1 to transmit the client object (S4205). Other procedures are the same as described above, so that they are not further described here. The communication sequence in this embodiment is the same as that described with reference to FIG. 40.

As described above, the use of the software installing apparatus of this embodiment makes it possible to start the latest object in the client PC.

Fourteenth Embodiment

Next, a fourteenth embodiment will be described with reference to the accompanying drawings.

Figure 43:
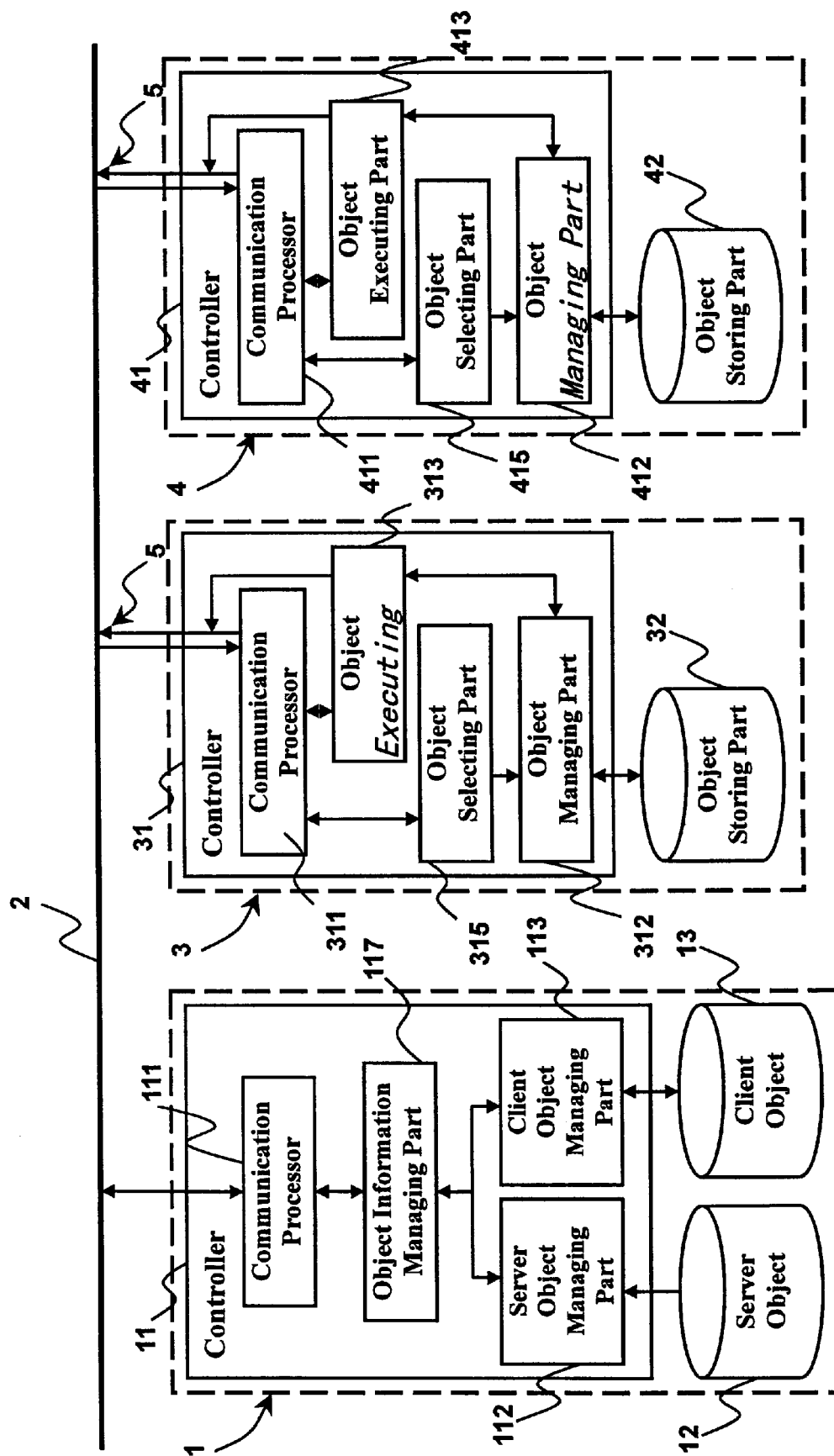
FIG. 43 is a functional block diagram showing the structure of a software installing apparatus in a fourteenth embodiment of the present invention.

FIG. 43 is a functional block diagram showing the structure of the software installing apparatus of this embodiment. As shown in FIG. 43, in this embodiment, this embodiment is different from the previous embodiments in that the PCs 3 and 4 include object selecting parts 315 and 415, respectively.

The object selecting parts 315 and 415 present a screen displaying a list of available objects so that a user can select an object to be transmitted. The respective communication processors of the PCs request the object management server 1 to transmit the selected objects.

The communication sequence in this embodiment is the same as that described with reference to FIG. 40, except that before an object transmission request is supplied, a list of available objects is displayed on a screen and a user selects an object in this embodiment.

The object management server 1 of this embodiment includes an object information managing part 117 as in the eighth embodiment. Therefore, in the case where a user who selected an object is not permitted to access the selected object, the object is not transmitted.

As described above, the use of the software installing apparatus of this embodiment makes it possible to transmit only the object necessary for a user. Thus, the workload on the network can be reduced.

Fifteenth Embodiment

Next, a fifteenth embodiment will be described with reference to the accompanying drawings.

The structure of the software installing apparatus of this embodiment is the same as that described with reference to FIG. 6, except that the server object 12 and the client object 13 are divided into a plurality of modules, if necessary, in this embodiment.

Figure 44A:
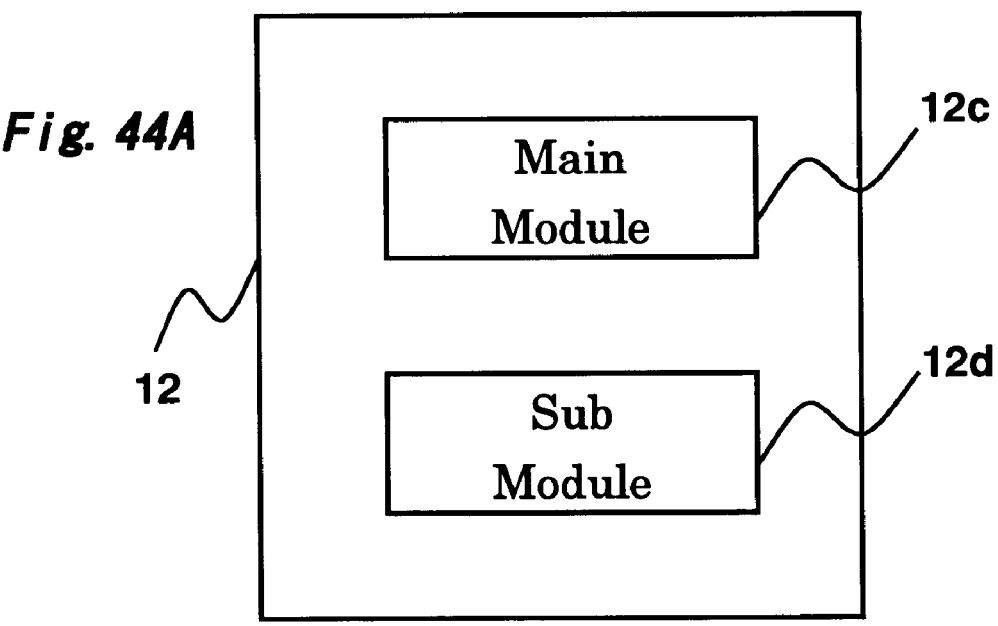
FIG. 44A is a schematic diagram showing the content of a server object in a fifteenth embodiment of the present invention.
Figure 44B:
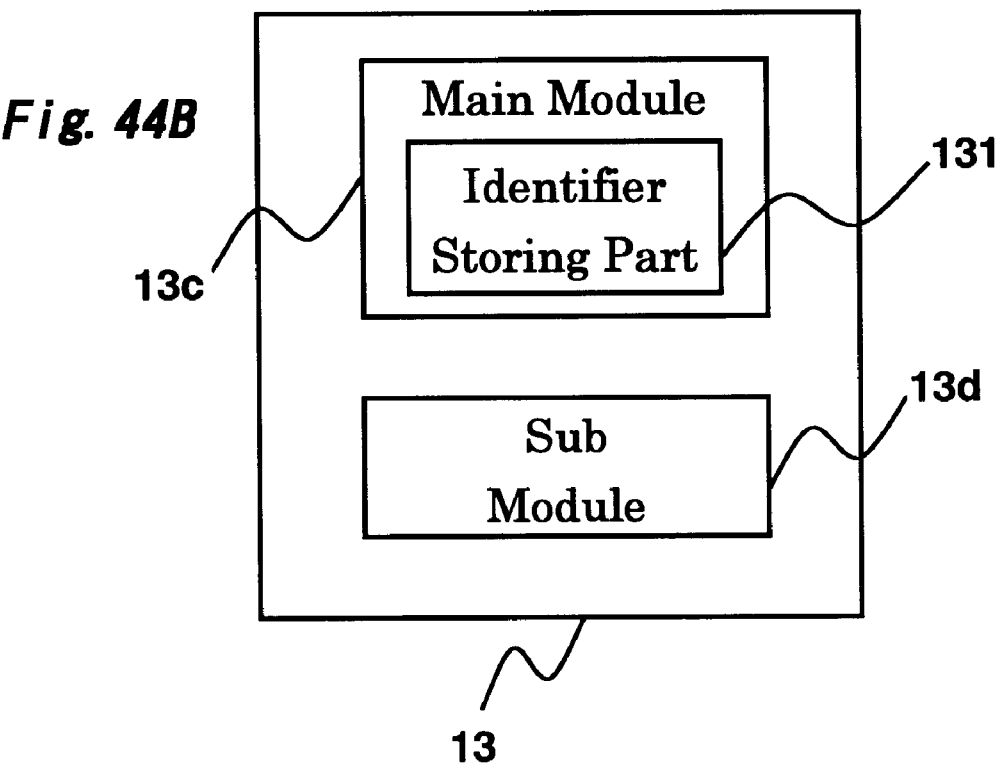
FIG. 44B is a schematic diagram showing the content of a client object in the fifteenth embodiment of the present invention.

FIGS. 44A and 44B are schematic diagrams showing the contents of the server object and the client object. FIG. 44A is a schematic diagram showing the content of the server object 12. As described in FIG. 44A, the server object 12 in this embodiment is divided into a plurality of modules 12c and 12d when being stored.

FIG. 44B is a schematic diagram showing the content of the client object 13. As described in FIG. 44B, the client object 13 in this embodiment includes an identifier storing part 131 and is divided into a plurality of modules 13c and 13d when being stored.

Among such divisional modules, one module is necessarily the main module, and the other modules are called by the main module when it is necessary. In this embodiment, the modules 12c and 13c are the main modules and the other modules are submodules.

The object management server 1 in this embodiment first transmits only the main module when the PC 3 or 4 is connected to the LAN 2. Hereinafter, the case where the PC 3 is connected to the LAN 2 will be described.

When the PC 3 is connected, the main module 12c of the server object 12 is transmitted in the same procedures as described above, and the transmitted main module 12c of the server object 12 operates in the object executing part 313 of the PC 3.

In this embodiment, when the object executing part 313 executes the transmitted server object 12, the submodule 12d is called by the main module 12c. In this case, the object executing part 313 first requests the object managing part 412 to fetch the submodule 12d. However, the submodule 12d is not stored in the object storing device 32 of the PC 3, so that a notification notifying that the submodule 12d is not stored in the object storing device 32 is supplied to the object executing part 313. More specifically, it can be detected by an error message reading "no module" in a DLL (Dynamic Link Library) that the submodule 12d is not stored.

Upon the reception of the notification, the object executing part 313 requests the communication processor 311 to transmit the submodule 12d.

The communication processor 311 requests the object management server 1 to transmit the submodule 12d. Thereafter, according to the regular communication sequence, the submodule 12d is transmitted to the PC 3, and the operation of the server module 12 resumes.

As described above, the use of the software installing apparatus of this embodiment makes it possible to transmit only the necessary module among divisional modules. Thus, the workload on the network can be reduced.

In this embodiment, the IP address is used as the identifier of a computer, but any identifier can be used as long as it identifies the computer uniquely.

Furthermore, in this embodiment, it is described for the sake of convenience that the server object 12 and the client object 13 are stored in different storage devices. However, physically the same storage device can store both objects.

Figure 45:
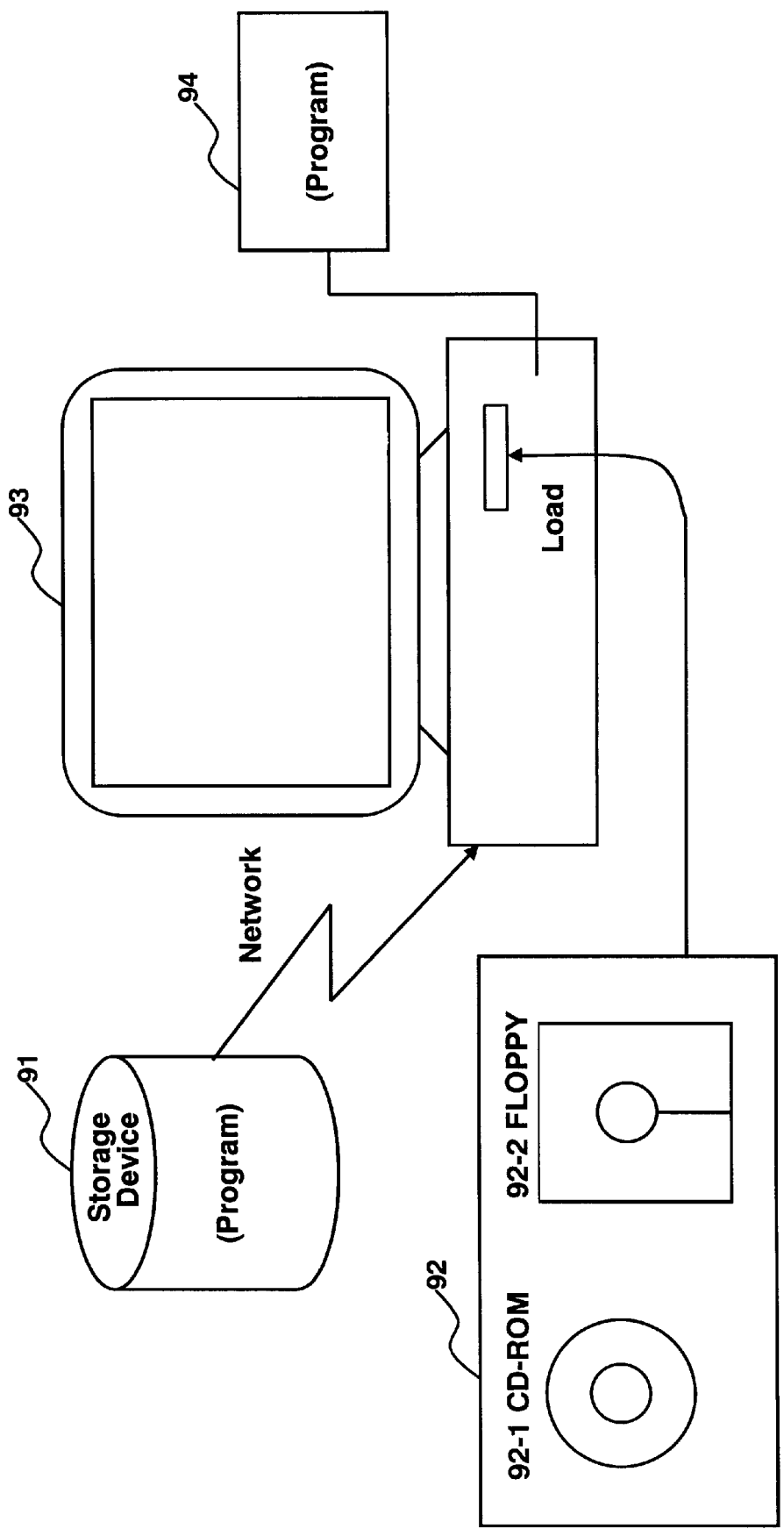
FIG. 45 is a diagram showing exemplary recording mediums.

A recording medium in which programs for realizing the software installing method of the present invention are recorded can be not only a transportable recording medium 92 such as a CD-ROM 92-1, or a floppy disk 92-2, but also a wired storage device 91 or a fixed recording medium such as a hard disk of a computer or a RAM 94, as shown in FIG. 45. The program 94 is loaded into the main memory of a data processing device including an output device 93, and executed.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A software installing apparatus for installing a server object to a computer platform and installing a client object which collaborates with the server object to at least one computer platform via a computer network, comprising:
    a server object storage for storing at least one server object;
    server identifier acquiring means for acquiring a server identifier of a computer on which a selected server object will be installed and operated;
    a client object storage for storing at least one client object including a server identifier storage for storing the identifier acquired by the server identifier acquiring means;
    a server identifier storing means for storing the server identifier acquired by the server identifier acquiring means into the server identifier storage included in the client object corresponding to the operating server object; and
    object transmitting means for transmitting the selected server object to the computer on which the server object will be installed in response to a request from the computer to be a server computer and transmitting the selected client object to the computer on which the client object will be installed in response to a request from the computer to be a client computer.

2. The software installing apparatus according to claim 1, wherein
    the server object and the client object include a main application that operates and a control object that starts, the main application;
    the identifier storage is included in the control object of the client object; and
    the object transmitting means transmits only the control object or the control object and the main application.

3. The software installing apparatus according to claim 2, further comprising:
    client object operation end detecting means for detecting an end of operation of the client object in the computer on which the client object operates;
    counting means for counting the number of computers on which the client object operates, based on the number of times the client object is transmitted and the number of times of the end of the operation, detected by the client object operation end detecting means; and
    count determining means for determining whether or not the number of the computers on which the client object operates, counted by the counting means, becomes zero.

4. The software installing apparatus according to claim 2, further comprising:
    a first table storing a list of operating server objects; and
    a second table storing a corresponding relationship between the client object and an identifier of a computer on which the client object can operate;
    wherein the object transmitting means transmits only the client object that can be used in a computer that requested to transmit the client object to the computer with reference to the first and second tables.

5. The software installing apparatus according to claim 2, further comprising:
    new object receiving means for receiving a new object transmitted from a computer;
    object determining means for determining whether the object received by the new object receiving means is the server object or the client object; and
    object storing means for storing the object received by the new object receiving means in at least one of the server object storage and the client object storage.

6. The software installing apparatus according to claim 2, further comprising:
    server object operation managing means for determining whether a computer on which the server object is operating exists; and
    in the case where the server object operation managing means receives a notification of a start of the server object, the object transmitting means transmits the client object corresponding to the server object to a computer that requested to transmit the corresponding client object, before the server object starts.

7. The software installing apparatus according to claim 2, further comprising:

server object operation end detecting means for detecting an end of operation of the server object in a computer on which the server object is operating; and client object operation terminating means for terminating operation of the client object corresponding to the server object when the server object operation end detecting means detects the end of the operation of the server object.

8. The software installing apparatus according to claim 2, further comprising:

a table storing a corresponding relationship between a plurality of networks and objects available for each network; and network identifying means for identifying a network to which a computer is connected, wherein the object transmitting means transmits only the object available for the network, determined by the network identifying means with reference to the table.

9. The software installing apparatus according to claim 2, further comprising:

a first table storing a corresponding relationship between locations of a computer and objects available for each location;

a second table storing a corresponding relationship between users and a computer carried by each user;

user identifying means for identifying a user with reference to the second table when a computer is connected; and user location identifying means for identifying a location of a user identified by the user identifying means, wherein the object transmitting means transmits only the object available for the location with reference to the first table, based on the location of the user identified by the user location identifying means when a computer is connected.

10. The software installing apparatus according to claim 2, further comprising:

a table storing a corresponding relationship between a plurality of networks and objects available for each network; and network designation receiving means for receiving a designation of a network from a computer that is connected thereto from outside the network, wherein the object transmitting means transmits only the object available for the designated network with reference to the table.

11. The software installing apparatus according to claim 2, wherein:

in the case where the object includes a plurality of modules, the server object storage and the client object storage store the object, divided into a plurality of modules, and the object transmitting means transmits a divisional module when the computer needs the divisional module.

12. The software installing apparatus according to claim 1, further comprising:

client object operation end detecting means for detecting an end of operation of the client object in the computer on which the client object operates;

counting means for counting the number of computers on which the client object operates, based on the number of times the client object is transmitted and the number of times of the end of the operation, detected by the client object operation end detecting means; and count determining means for determining whether or not the number of the computers on which the client object operates, counted by the counting means, becomes zero.

13. The software installing apparatus according to claim 1, further comprising:

a first table storing a list of operating server objects; and a second table storing a corresponding relationship between the client object and an identifier of a computer on which the client object can operate;

wherein the object transmitting means transmits only the client object that can be used, in a computer that requested to transmit the client object to the computer with reference to the first and second tables.

14. The software installing apparatus according to claim 1, further comprising:

new object receiving means for receiving a new object transmitted from a computer;

object determining means for determining whether the object received by the new object receiving means is the server object or the client object; and object storing means for storing the object received by the new object receiving means in at least one of the server object storage and the client object storage.

15. The software installing apparatus according to claim 1, further comprising:

server object managing means for determining whether a computer, on which the server object is operating, exists, wherein, in the case where the server object operation managing means receives a notification of a start of the server object, the object transmitting means transmits the client object corresponding to the server object to a computer that requested to transmit the corresponding client object before the server object starts.

16. The software installing apparatus according to claim 1, further comprising:

server object operation end detecting means for detecting an end of operation of the server object, in a computer on which the server object is operating; and client object operation terminating means for terminating operation of the client object, corresponding to the server object, when the server object operation end detecting means detects the end of the operation of the server object.

17. The software installing apparatus according to claim 1, further comprising:

a table storing a corresponding relationship between a plurality of networks and objects available for each network; and network identifying means for identifying a network to which a computer is connected, wherein the object transmitting means transmits only the object available for the network, determined by the network identifying means with reference to the table.

18. The software installing apparatus according to claim 1, further comprising:

a first table storing a corresponding relationship between locations of a computer and objects available for each location;

a second table storing a corresponding relationship between users and a computer carried by each user;

user identifying means for identifying a user with reference to the second table when a computer is connected; and user location identifying means for identifying a location of a user identified by the user identifying means, wherein the object transmitting means transmits only the object available for the location with reference to the first table, based on the location of the user identified by the user location identifying means when a computer is connected.

19. The software installing apparatus according to claim 1, further comprising:

a table storing a corresponding relationship between a plurality of networks and objects available for each network; and network designation receiving means for receiving a designation of a network from a computer that is connected thereto from outside the network, wherein the object transmitting means transmits only the object available for the designated network with reference to the table.

20. The software installing apparatus according to claim 1, wherein:

in the case where the object includes a plurality of modules, the server object storage and the client object storage store the object, divided into a plurality of modules, and the object transmitting means transmits a divisional module at the time when the computer needs the divisional module.

21. A method for installing software in a system for installing a server object to a computer platform and installing a client object which collaborates with the server object to at least one computer platform via a computer network, the method comprising the steps of:

acquiring a server identifier of a computer on which a selected server object will be installed and operated;

storing at least one client object including a server identifier storage for storing the identifier acquired by the server identifier acquiring step;

storing the server identifier acquired by the server identifier acquiring step into the server identifier storage included in the client object corresponding to the operating server object; and transmitting the selected server object to the computer on which the server object will be installed in response to a request from the computer to be a server computer and transmitting the selected client object to the computer on which the client object will be installed in response to a request from the computer to be a client computer.

22. A computer-readable recording medium storing a program for installing a server object to a computer platform and installing a client object which collaborates with the server object to at least one computer platform via a computer network, the program executing the steps of:

acquiring a server identifier of a computer on which a selected server object will be installed and operated;

storing at least one client object including a server identifier storage for storing the identifier acquired by the server identifier acquiring step;

storing the server client object, acquired by the server identifier acquiring step, into the server identifier storage included in the client object corresponding to the operating server object; and transmitting the selected server object to the computer on which the server object will be installed in response to a request from the computer to be a server computer and transmitting the selected client object to the computer on which the client object will be installed in response to a request from the computer to be a client computer.

* * * * *